Feb. 6, 1945. P. E. FLOWERS 2,368,756
MOLDING PRESS
Filed March 21, 1941 12 Sheets-Sheet 1
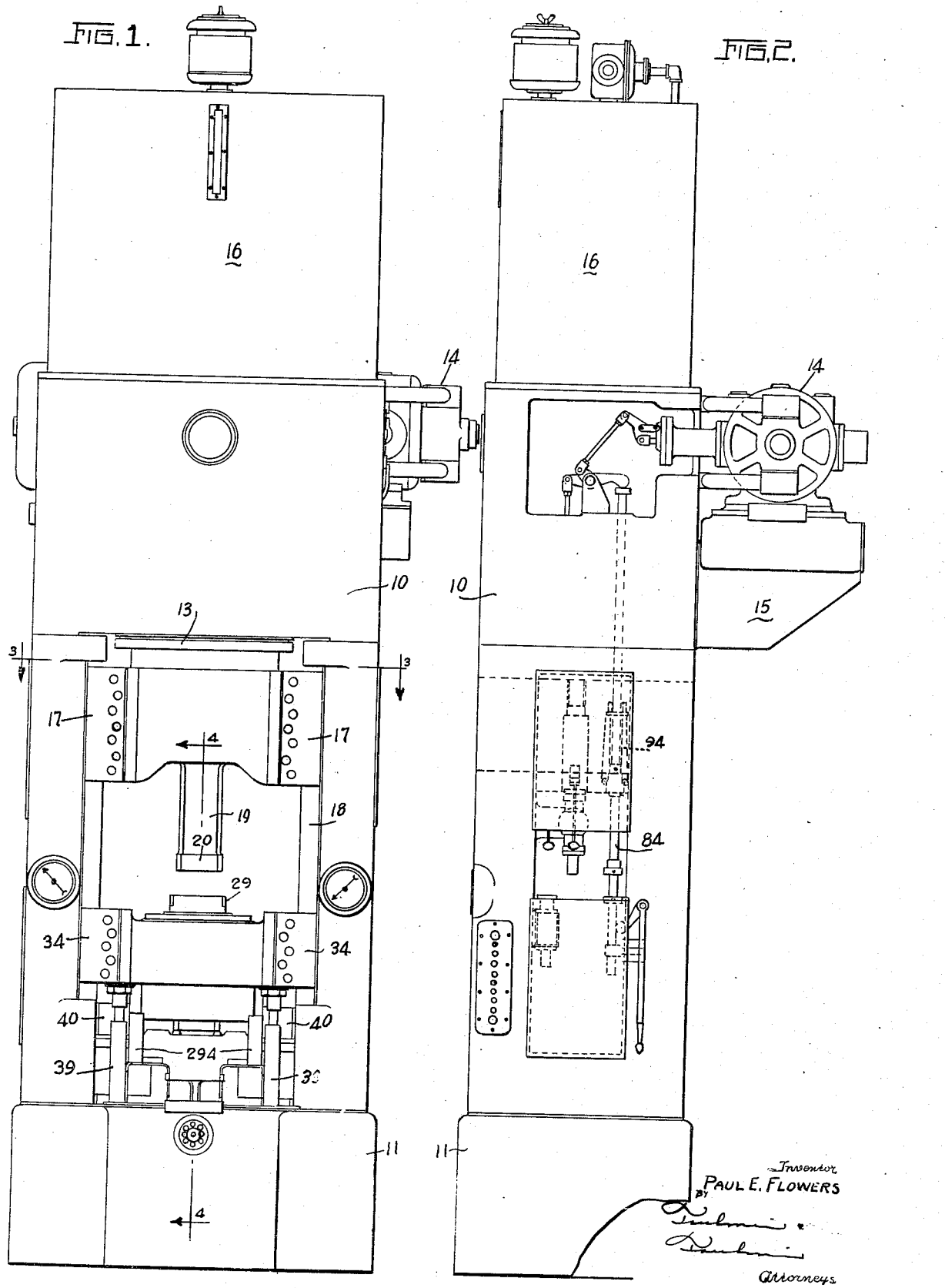
Inventor
PAUL E. FLOWERS
Attorneys Feb. 6, 1945. P. E. FLOWERS 2,368,756
MOLDING PRESS
Filed March 21, 1941 12 Sheets-Sheet 2
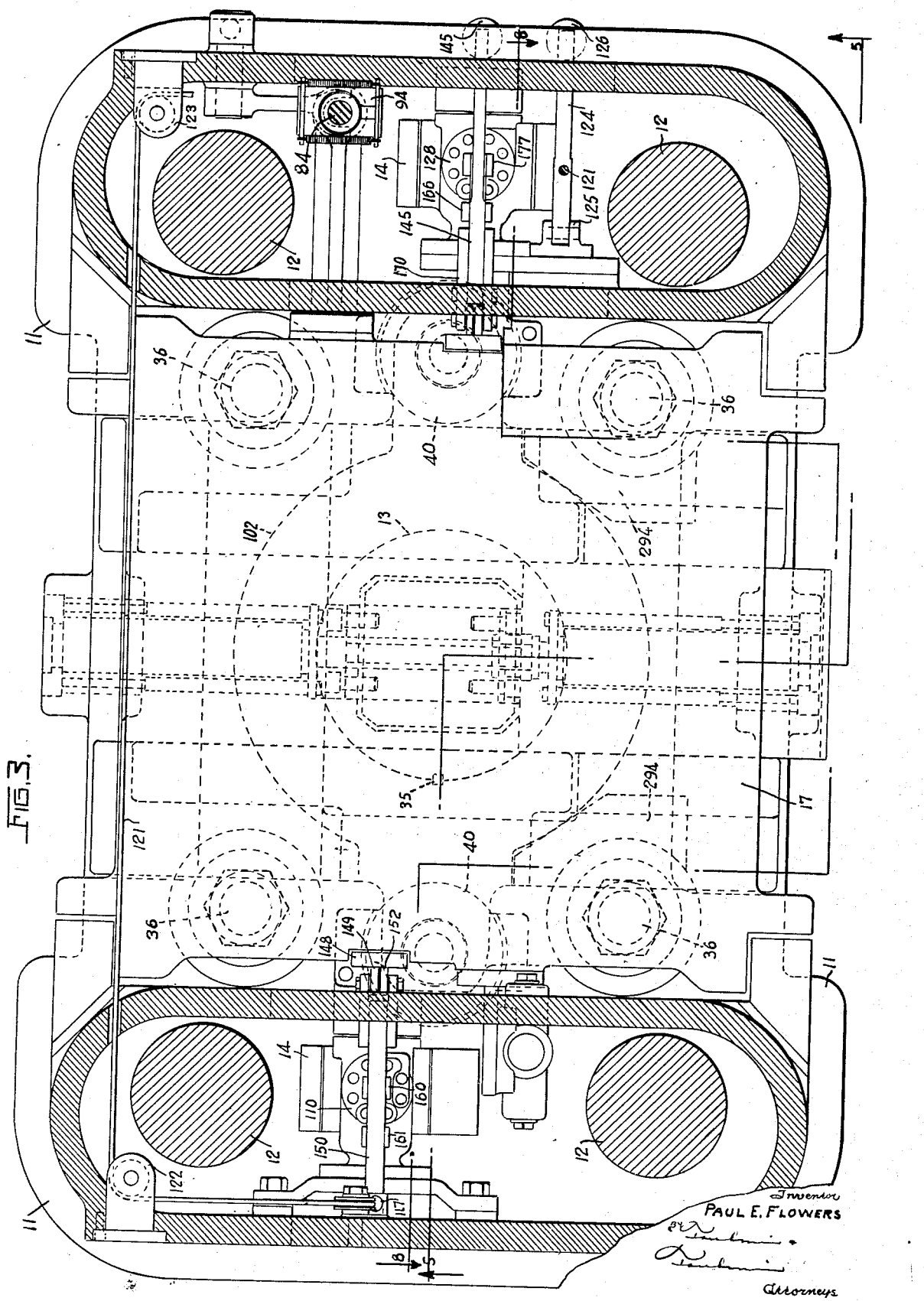
Inventor
PAUL E. FLOWERS
Attorneys

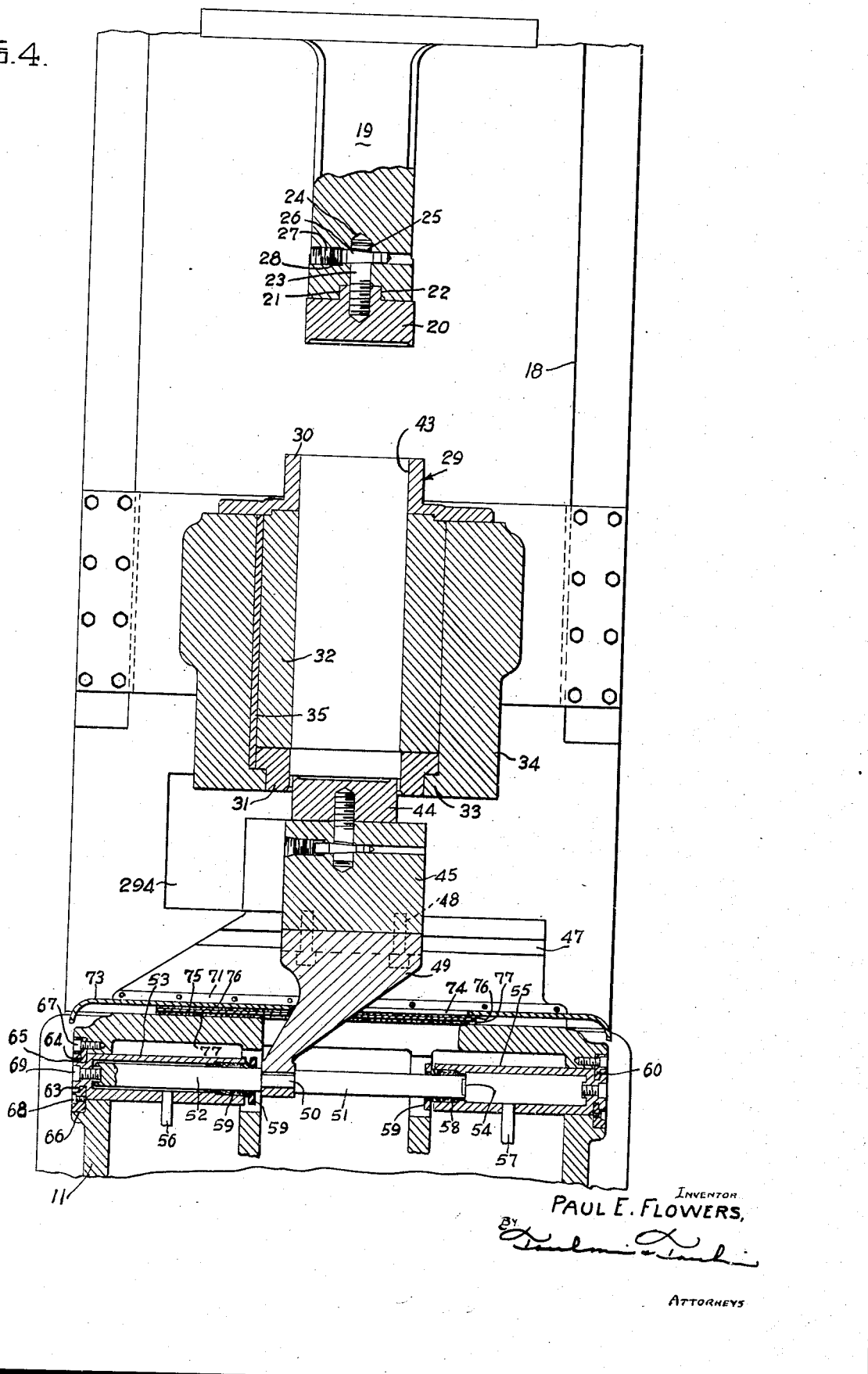

Feb. 6, 1945.  P. E. FLOWERS  2,368,756
MOLDING PRESS
Filed March 21, 1941 12 Sheets-Sheet 4

Inventor
PAUL E. FLOWERS,
Attorneys

Feb. 6, 1945.  P. E. FLOWERS  2,368,756
MOLDING PRESS
Filed March 21, 1941   12 Sheets-Sheet 5

Inventor
PAUL E. FLOWERS,
Attorneys

INVENTOR
PAUL E. FLOWERS
By ATTORNEYS

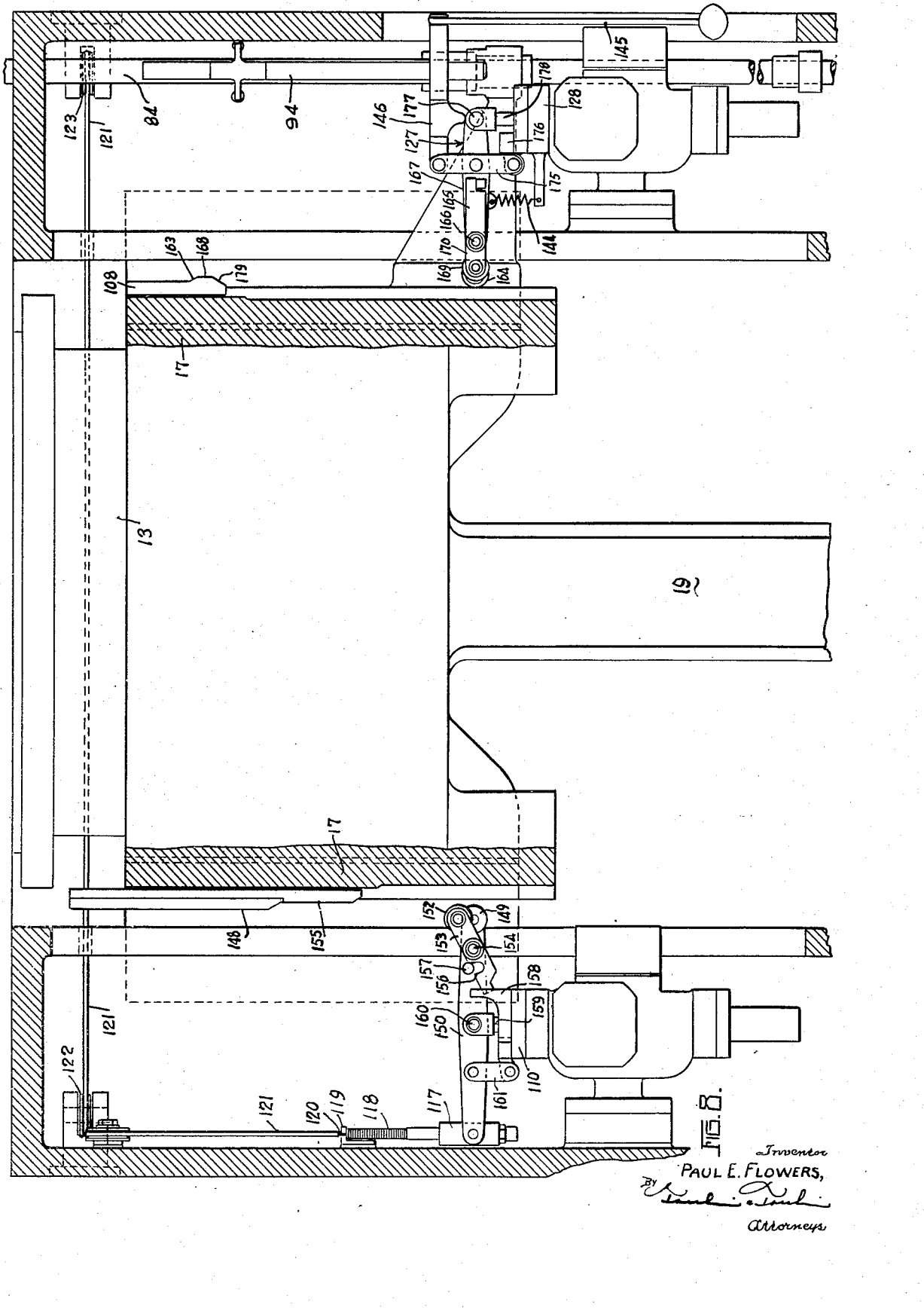

Feb. 6, 1945.   P. E. FLOWERS   2,368,756
MOLDING PRESS
Filed March 21, 1941   12 Sheets-Sheet 8
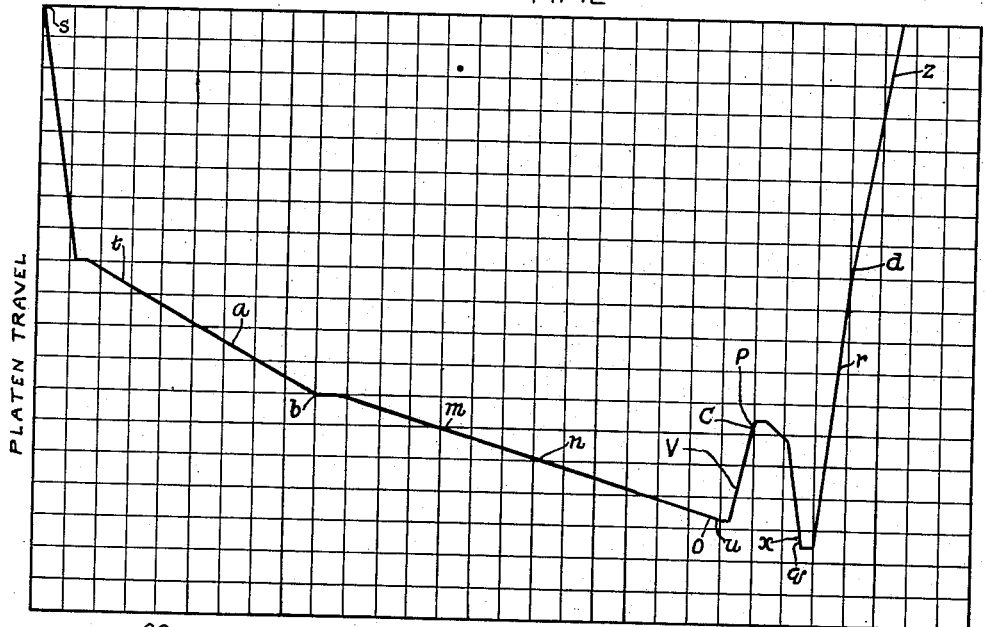
FIG. 21.
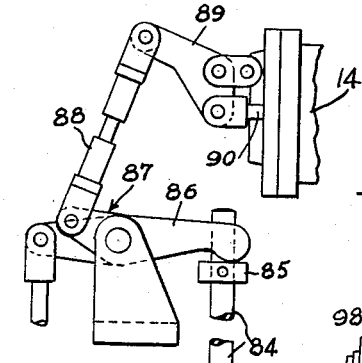
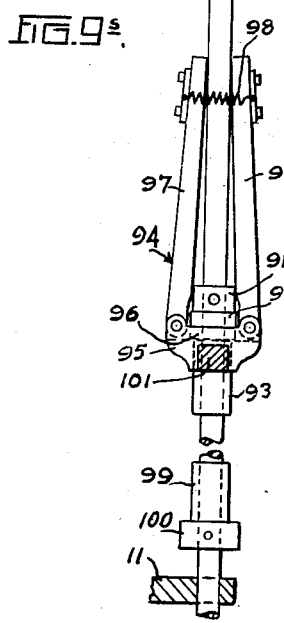
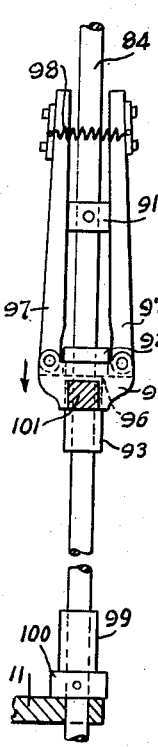
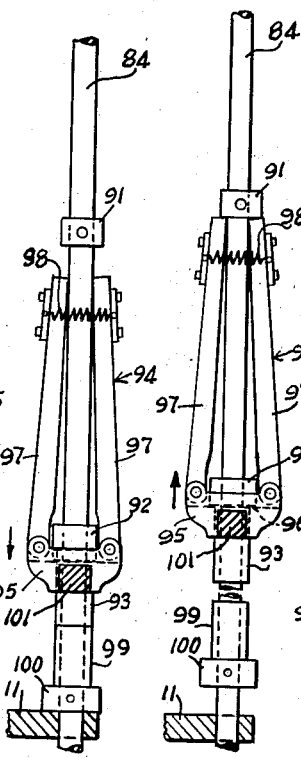
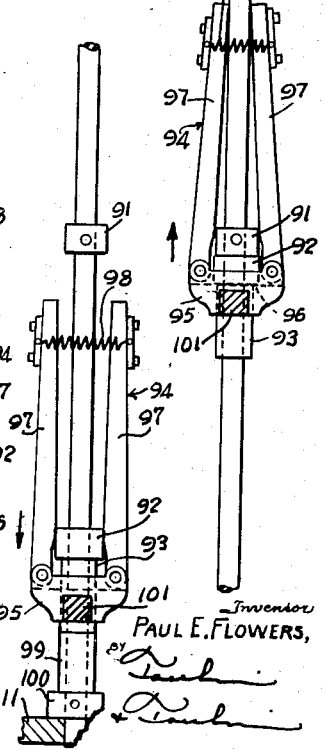
Inventor
PAUL E. FLOWERS,
by
Attorneys

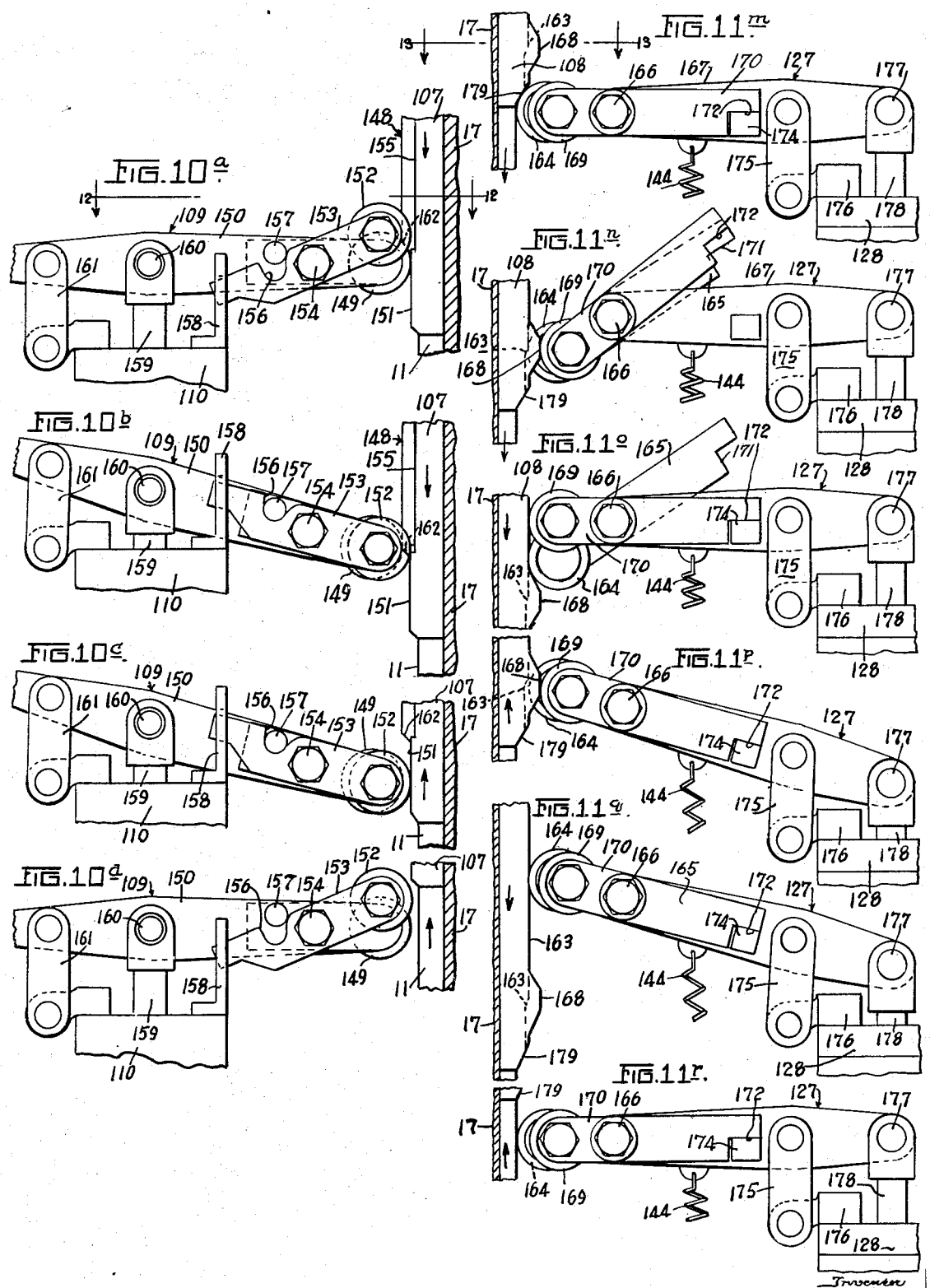

Feb. 6, 1945. P. E. FLOWERS 2,368,756
MOLDING PRESS
Filed March 21, 1941 12 Sheets-Sheet 10
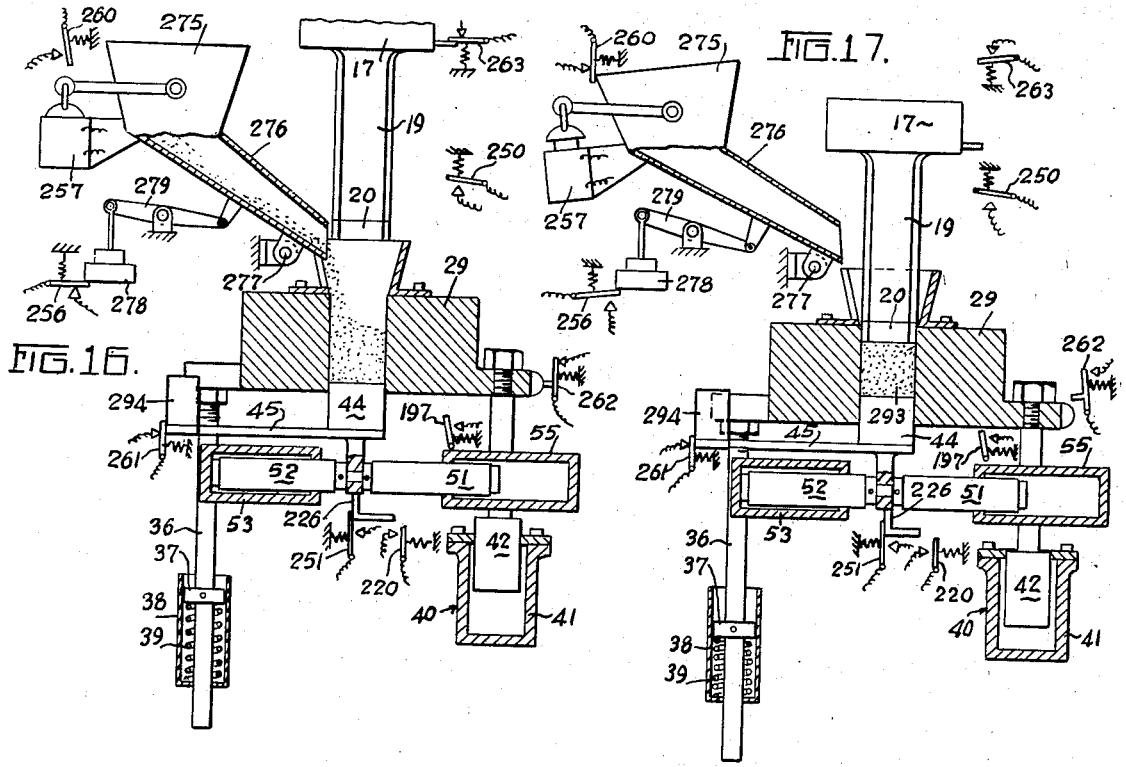
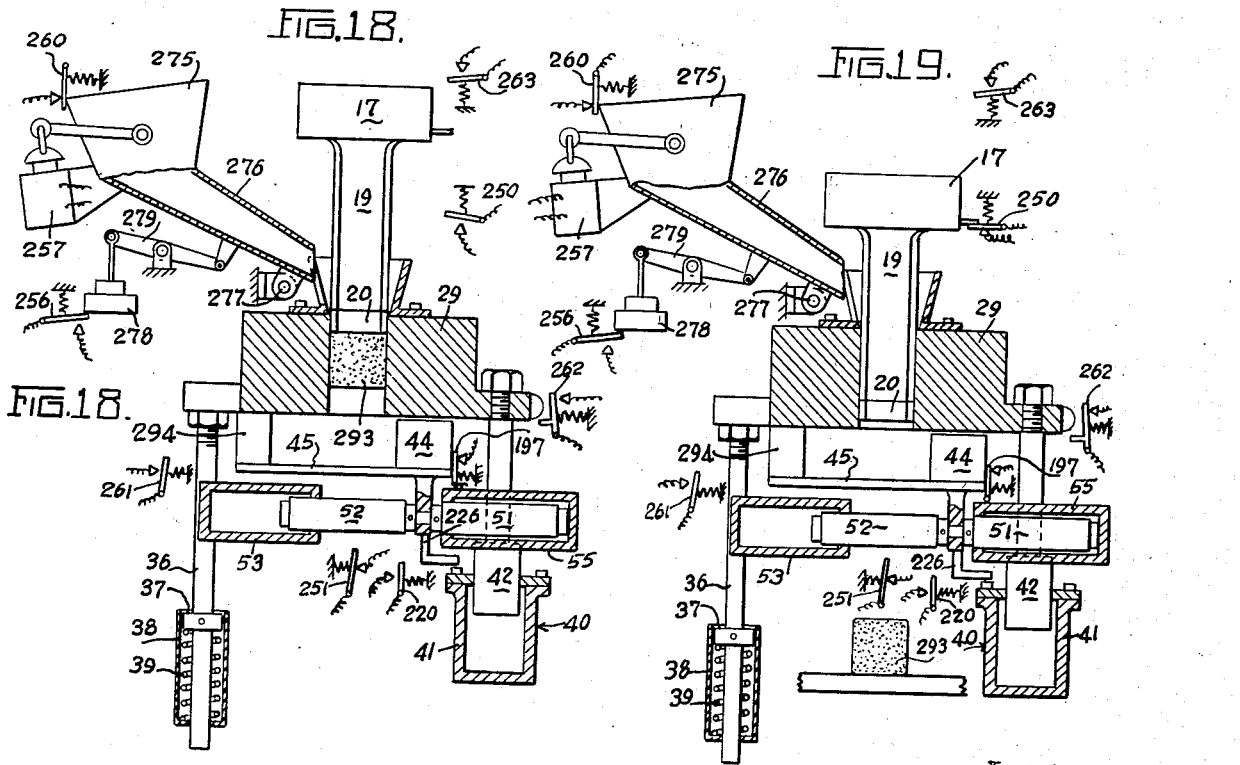
Inventor
PAUL E. FLOWERS,
Attorneys

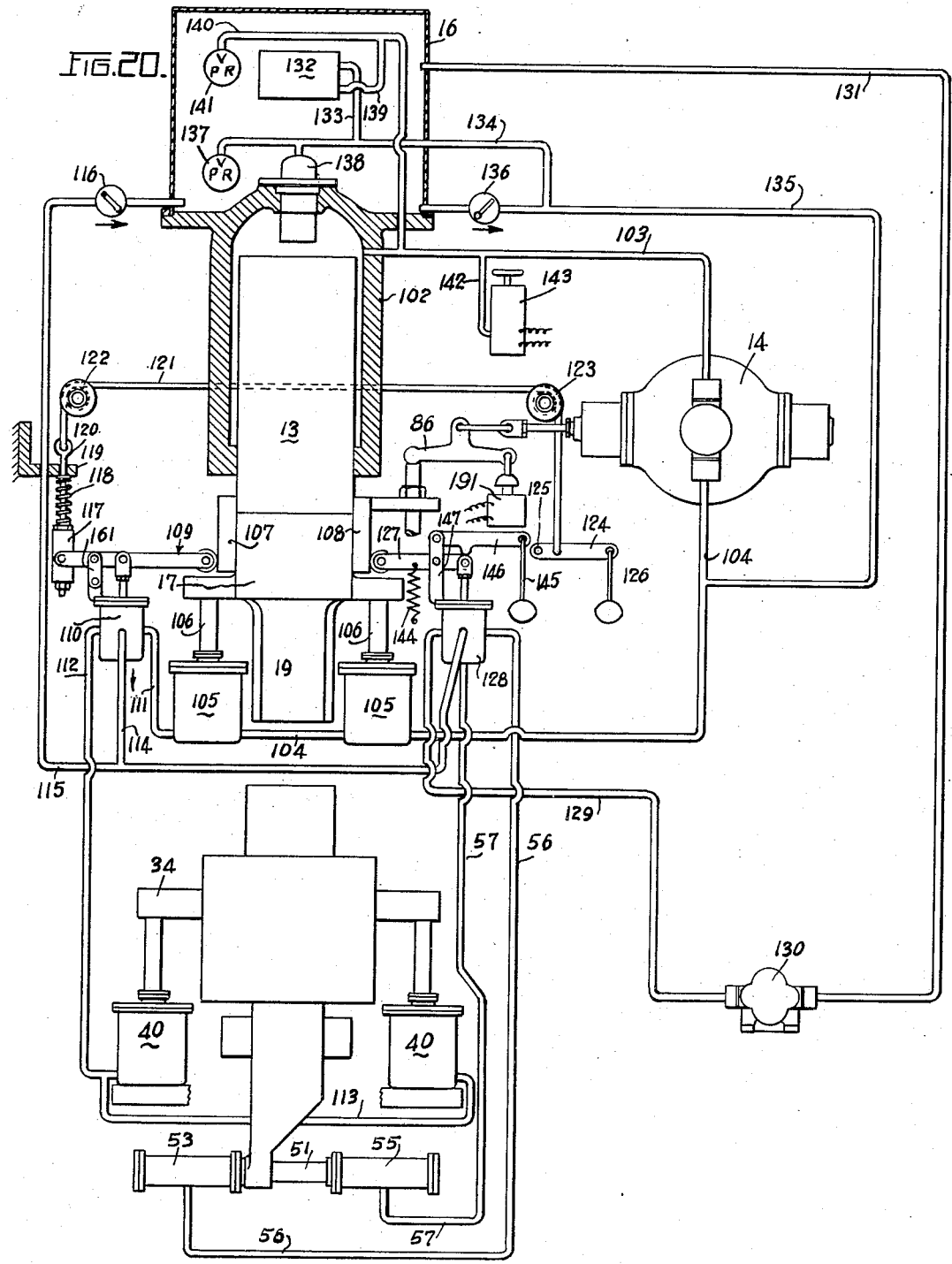

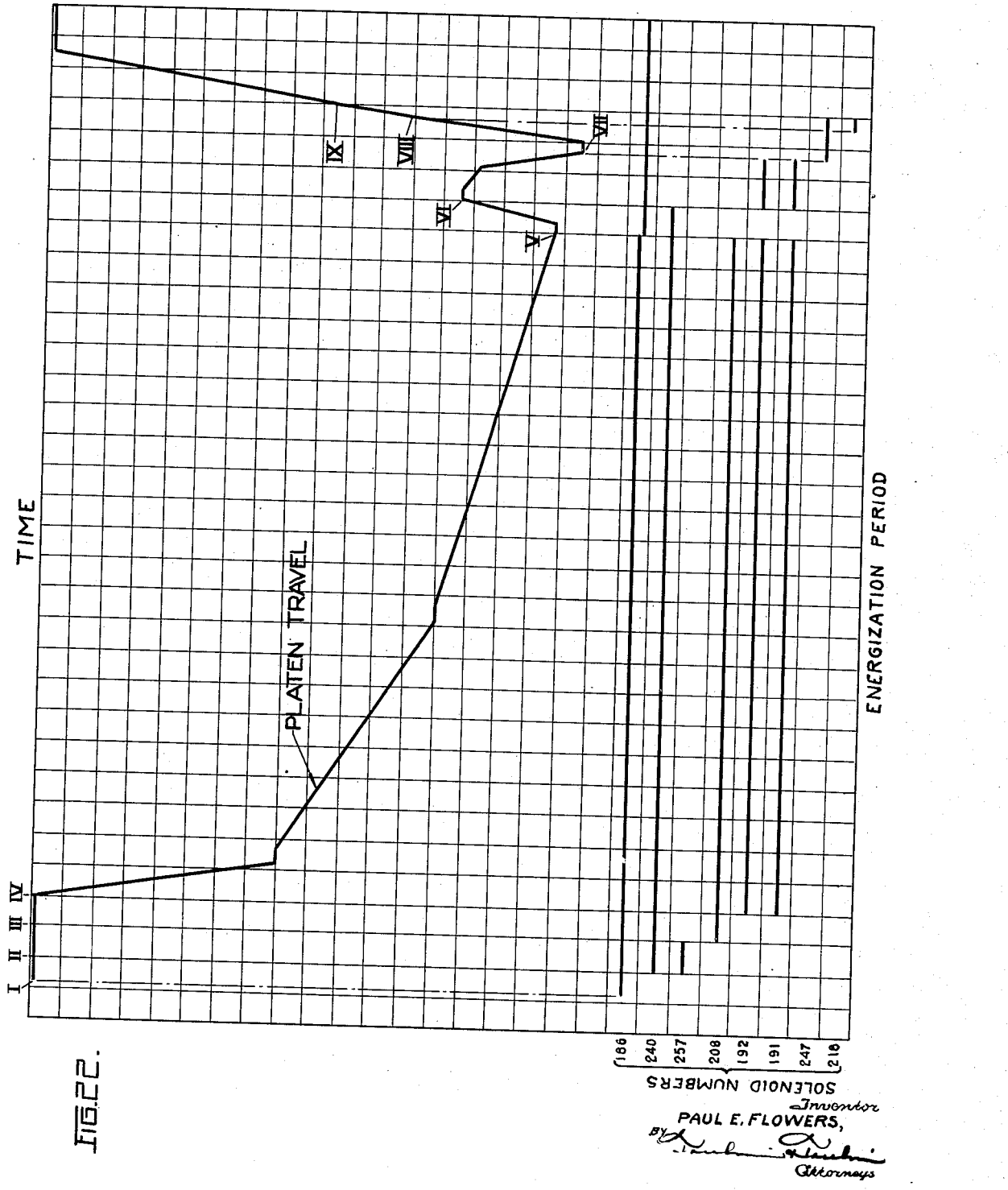

Patented Feb. 6, 1945

2,368,756

UNITED STATES PATENT OFFICE 2,368,756

MOLDING PRESS

Paul E. Flowers, Mount Gilead, Ohio, assignor to The Hydraulic Development Corporation, Inc., Wilmington, Del., a corporation of Delaware Application March 21, 1941, Serial No. 384,520

13 Claims. (Cl. 18—16)

This invention relates to hydraulic machinery, and in particular to hydraulic molding presses.

One object of the invention consists in the provision of a hydraulic molding press, in which mechanical means controls the molding plunger automatically so as to cause the same to carry out different strokes during one and the same working cycle of the press.

Another object is to provide a hydraulic molding press, in which mechanical controlling means is responsive to the travel of the press plunger for causing the latter first to carry out a molding stroke and thereafter an ejecting stroke.

It is another object to provide a molding press of the type set forth in the preceding paragraph, in which the molding plunger carries out a retraction stroke immediately preceding the ejecting stroke, and in which the said retraction stroke is shorter than the molding stroke of the plunger.

Another object of the invention consists in the provision of a press with a hydraulically operable press platen, in which a pressure fluid source for supplying pressure to actuate said platen is mechanically controlled by the latter so as to cause the platen to carry out only a partial retraction stroke following the pressing stroke and thereafter to perform an ejecting stroke and a complete return stroke.

It is a further object to provide a molding press comprising a die carrier, in which mechanical means is adapted, in response to the travel of the press plunger, selectively to initiate movement of said die carrier into or out of alignment with said press plunger.

A still further object of the invention consists in the provision of a press as mentioned in the preceding paragraph, in which the operation of hydraulically operable means for reciprocating the die carrier is mechanically controlled in response to the movement of the press plunger.

It is another object of the invention to provide a molding press comprising valve means which is controlled by double lever systems, one lever of which effects the shifting movement of said valve means in response to a predetermined point of travel of the press plunger, while the other lever of said lever systems locks said first mentioned lever in its respective position and releases it only in response to a predetermined point of travel of said press plunger.

It is a further object to provide a molding press which comprises hydraulically operable motor means for effecting an advancing and a retraction stroke of the press plunger, and a hydraulically operable cylinder-piston-assembly for lifting the mold, while mechanically controlled means is provided and adapted in response to the movement of the press plunger selectively to effect or interrupt hydraulic communication between said cylinder-piston-assembly and said motor means.

It is another object of the invention to provide a molding press which comprises simplified means for selectively connecting or disconnecting a die to a die supporting member.

Another object of the invention consists in the provision of a molding press having a horizontally reciprocable die carrier, in which fluid operable means for actuating said die carrier is arranged in the press bed and may be removed therefrom as a unit.

A still further object is to provide a molding press in which the mold is supported by yielding means adapted to be preloaded during the molding operation for retracting the mold to its initial position.

It is a still further object of the invention to provide a molding press in which means is provided for filling the mold with molding material in response to the initiation of a working cycle, and in which said means is automatically made ineffective in case the material previously filled into the mold has not been ejected.

Still another object of the invention consists in the provision of a molding press with a measuring device for measuring off and dispensing a predetermined charge into the mold, in which selectively one or a plurality of measured charges may be unloaded into the mold before starting the molding operation.

It is another object to provide a molding press with a combined mechanical and electrical control system, which may selectively be operated with or without the electrical part of said control system.

These and other objects and advantages of the invention will appear more clearly from the following specification in connection with the accompanying drawings, in which:

Figure 1 illustrates a front view of the press according to the invention.

Figure 2 is a side view of the press shown in Figure 1.

Figure 3 is a section along the line 3—3 of Figure 1.

Figure 4 is a section along the line 4—4 of Figure 1.

Figure 8 illustrates, partly in section, the press platen in connection with mechanical controlling means actuated thereby.

Figure 9 shows a part of the mechanical controlling means of the press in different positions designated s, t, u, v, x and z.

Figures 10 and 11 show further mechanical controlling means in different positions respectively designated a, b, c, d and m, n, o, p, q, r.

Figure 12 is a view along the line 12—12 of Figure 10a.

Figure 16 shows diagrammatically the filling of the mold prior to the initiation of the molding stroke.

Figure 17 is a view similar to Figure 16 showing the initial phase of the molding stroke.

Figure 18 illustrates the molding plunger just prior to the beginning of the ejecting stroke.

Figure 19 shows the molding plunger at the end of its ejecting stroke.

Figure 20 is a diagrammatic illustration of the hydraulic circuit of the press according to the invention.

Figure 21 is a graph illustrating the platen travel and the points of operation of the mechanical controlling means during the travel of the platen.

Figure 22 is an energization chart of the various solenoids controlling the different operations during the pressing cycle.

General arrangement

Figure 5:
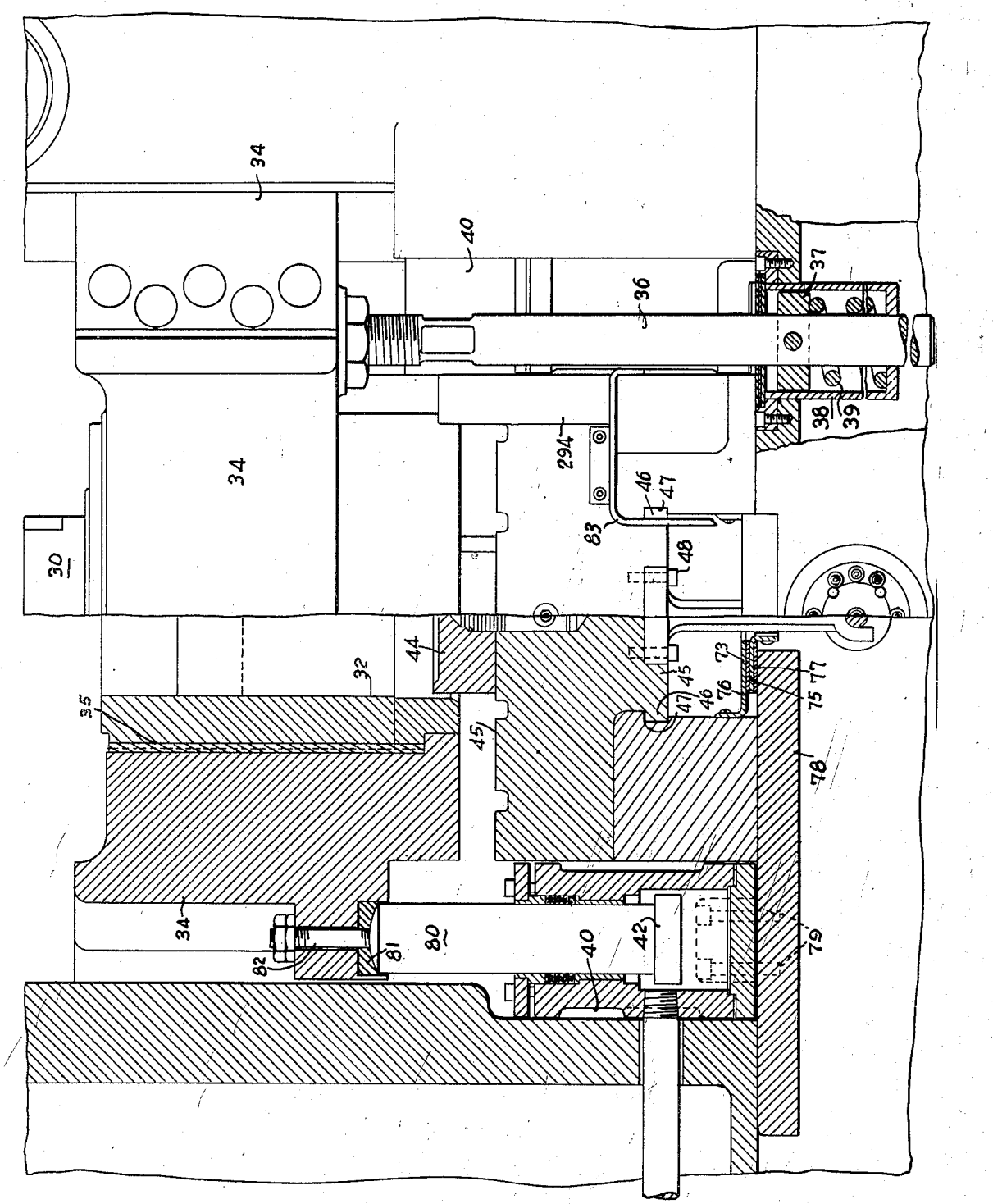
Figure 5 is a section along the line 5—5 of Figure 3 and shows, partly in section, hydraulic lifting means for the mold and the die carrier for the lower die.

The hydraulic press according to the invention is a vertical molding press having a main molding plunger with an upper die and a movable mold with an opening at its bottom portion, which opening is adapted to be closed by a lower die.

The molding plunger with the upper die, and the mold are movable vertically, whereas the lower die is movable horizontally so that the latter may selectively release the opening at the mold bottom portion to allow the main plunger to eject the molded piece from the mold after the completion of a molding stroke.

Mechanical controlling elements are provided for timing the motions of the main molding plunger, the means for horizontally shifting the lower die, and the operation of the mold raising plungers, so that each will accomplish its motion at the proper relative time.

The mechanical controlling means cooperate with electric means for controlling the supply of pressure fluid for actuation of the molding plunger. This electric circuit is also arranged so that the press may be caused to operate selectively in semi-automatic or full automatic manner, so that it respectively carries out one single molding cycle and then stops, or performs a plurality of subsequent molding cycles.

Means is also provided for causing the press to accomplish alternate molding and ejection strokes, wherein the molding plunger is mechanically controlled so that the ejection stroke thereof is shorter than the molding stroke.

Furthermore, the press according to the invention comprises simplified means in the form of tapered connecting pins for connecting the upper and lower dies to the molding plunger and die carrier respectively, which means materially facilitate the exchange of the dies without having to remove any other parts from the press.

According to a further feature of the invention, a hydraulically operable cylinder-piston-assembly for shifting the lower die is arranged within the press bed so that it can be removed therefrom as a unit.

STRUCTURAL ARRANGEMENT

General arrangement

Referring now to the drawings in detail, the press comprises a press head 10 and a press bed 11 interconnected with each other by strain rods 12. Reciprocably mounted in the press head 10 is a press ram 13 adapted to be actuated by pressure fluid supplied by a variable delivery pump 14, which latter is carried by a support 15 connected to the press head 10.

The variable delivery pump comprises a shiftable flow control member, the position of which, relative to a central pumping member, determines the delivery of the pump. Pumps of this type are well known in the art and for a more detailed description thereof reference may be had to Patent 2,159,553 to Ernst.

The press head also carries a fluid reservoir or surge tank 16. Operatively connected to the press ram 13 is a press platen 17 guided on guiding surfaces 18 and supporting a press plunger 19. The press plunger 19 has connected to the lower end thereof an upper die 20 (Figures 1 and 4). The upper die 20 is provided with a protruding portion 21 engaging a correspondingly recessed portion 22 in the pressing plunger 19.

Threaded into the upper die 20 is a bolt 23 engaging a corresponding bore 24 in the pressing plunger 19 and having a tapered bore 25 through which passes a tapered bolt 26. The adjustment of the tapered bolt 26 is effected by means of a nut 27 which is held in its respective position by a lock nut 28.

Cooperating with the upper die 20 and the pressing plunger 19 is a mold 29 comprising a top portion 30, a lower portion 31 and an intermediate portion 32 interconnecting the upper and lower portions 30 and 31.

The mold 29 is supported by a flange 33 of a movable mold support 34, which is slidable on the guiding surfaces 18. Relative angular movement between the mold 29 and the movable mold support 34 is prevented by a key 35 engaging the support 34 and the mold 29. The movable mold support 34 has connected thereto two piston rods 36 with pistons 37 which are reciprocably mounted in cylinders 38 housing a spring 39 continuously urging the pistons 37 and, thereby, the mold 29 to their uppermost position. The movable mold support 34 is furthermore supported by and connected with two jacks generally designated 40, each of which comprises a fluid cylinder 41 and a piston 42.

The mold 29 has a slightly tapered bore 43 therethrough for receiving the molding material, e. g., salt. The slight taper of the bore 43 merely serves the purpose of facilitating the ejection of the molded piece. The lower end of the bore 43 may selectively be closed by the lower die 44 which is connected to a die carrier 45 preferably in the same manner as the upper die 20 to the pressing plunger. The die carrier 45 is provided with a guiding flange 46 slidably movable in a correspondingly shaped recess 47 of the press bed 11 (Figure 5). Also connected to the die carrier 45 are two supporting blocks 294 (Figures 3, 4, 16) which hold the mold 29 lifted and spaced from the die 44 during the ejecting stroke of plunger 19 (Figures 18 and 19).

Detachably connected to the die carrier 45, for instance by means of screws 48, is an arm 49, the lower end of which is fork shaped and straddles a reduced portion 50 of a die carrier shifting plunger generally designated 51, one end 52 of which is reciprocably mounted in a cylinder 53, while the other end 54 of the shifting plunger 51 is reciprocably mounted in a cylinder 55. The cylinders 53 and 55 are respectively connected with conduits 56 and 57. To prevent leakage from the cylinders 53 and 55, the ends thereof facing each other are provided with packing material 58 compressed by glands 59. The other ends of the cylinders 53 and 55 have preferably mounted therein an adjustable abutment, such as a screw 53a and 55a adapted respectively to engage a correspondingly shaped recess 52a and 54a. The cooperation of said recesses and abutments also serves as cushioning means when the plunger 51 approaches one or the other end position.

Figure 7:
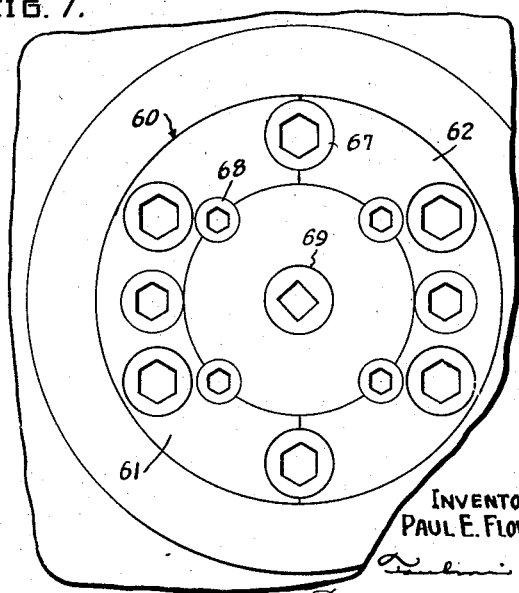
Figure 7 is a view along the line 7—7 of Figure 6.

Each of the cylinders 53, 55 is held in the press bed 11 by means of a split ring 60 (Figure 7) comprising two segment portions 61 and 62 adapted to be composed to the ring 60. The segments 61 and 62 have a flanged ring portion 63 and 64 respectively, adapted to engage an annular recess 65 in the cylinders 53 and 55.

Figure 6:
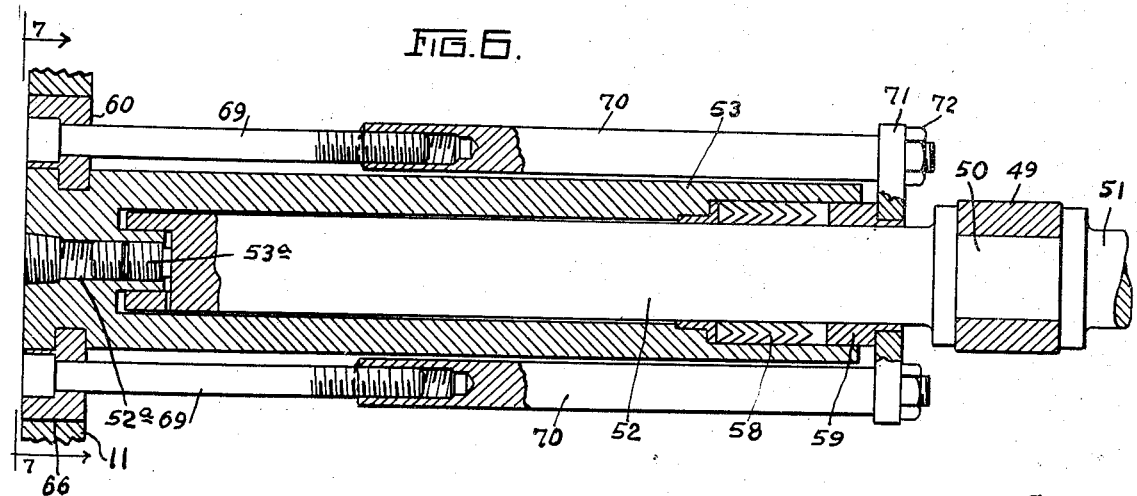
Figure 6 shows a detail of the shifting means for the die carrier.

The split ring 60 engages an annular recess 66 in the bed 11 and is connected to the latter in any convenient manner, for instance by means of screws 67. Angular displacement between the cylinders 53 and 55 and their respective split rings 60 is prevented by means of locating screws 68. Also passing through the split ring 60 are two bolts 69 (Figure 6) threadedly engaging bolts 70, the ends of which pass through a plate 71 connected to the bolts 70 by means of screws 72. As will be clear from the drawings, adjustment of the bolts 69 makes it possible to adjust the glands 59 in any desired manner.

To prevent molding material from falling into the space between the cylinders 53 and 55, an apron 73 is connected to the bed 11 in any convenient manner, and comprises a slot 74 through which passes the arm 49.

A further apron 75, beneath the apron 73, is connected in any convenient manner to the arm 49. The space between the aprons 73 and 75 is filled with a felt plate 76 connected to the apron 73 and slidable on the apron 75, which latter has attached to its lower side also a felt plate 77, adapted to slide on the bed plate 78. The apron 75 is so dimensioned that the slot 74 is always closed thereby, irrespective of the position of the arm 49.

The bed plate 78 has also connected therewith, for instance by screws 79, the jacks 40. The piston rods 80 connected with the jack piston 42 have a spherical end engaging a correspondingly shaped wear plate 81 connected in any convenient manner, for instance by bolts 82, to the movable mold support 34. The die carrier 45 has furthermore connected thereto an apron 83 which covers that portion of the guiding recess 47 which is not engaged by the guiding flange 46. In this way salt is likewise prevented from falling into the guiding recess 47.

*Mechanical control for variable delivery pump*

According to the present invention the delivery of the variable delivery pump 14 is controlled in response to the travel of the platen 17 in connection with the controlling mechanism shown in Figure 9 in various positions.

This controlling mechanism comprises a reciprocable push rod 84 having adjustably connected to its upper end a collar 85 adapted to engage the arm 86 of a lever, generally designated 87, which is connected by a link system 88, 89 with the control rod 90 for the flow control of the variable delivery pump 14. The rod 84 has furthermore adjustably connected thereto a collar 91 adapted to be engaged by a flange 92 of the sleeve 93 which is freely movable on the rod 84.

Slidably mounted on the sleeve 93 is a control member 94, which comprises a yoke member 95 with an annular recess 96 corresponding in diameter to the diameter of the flange 92 but somewhat less in height than the said flange. The yoke member 95 has pivotally connected thereto two arms 97, the upper ends of which are constantly urged toward each other by means of springs 98.

Furthermore connected to the rod 84 is a sleeve 99 with a flange 100 adapted to engage the bed 11 when the rod 84 is in its lowermost position. The yoke member 95 is connected by an arm 101 with the platen 17. The control device of Figure 9 operates as follows:

Supposing the pump 14 has been placed into full stroke forward delivery position so that the platen 17 now starts its downward stroke. The yoke member 95, due to its connection to the platen by arm 101, will likewise start to move downwardly. Consequently, the push rod 84, due to its weight, will move from the position shown in Figure 9s downwardly until its movement is stopped by engagement of the flange 100 with the bed 11. When now the platen 17 continues its downward movement, the yoke member 95 will also continue its downward movement but since the push rod 84, due to the engagement of the collar 100 with the bed 11, has been stopped, the inner surfaces of the arms 97 slide over the collar 91 and relative thereto, thereby spreading, as shown in Figure 9t.

Further downward movement of the platen 17 and yoke member 95 causes the arms 97 to pass below the collar 91 so that the springs 98 again move the upper ends of the arms 97 toward each other against the push rod 84. When the platen approaches its lowermost point, the sleeve 99 engages the sleeve 93, thereby stopping the latter, but since the sleeve 93 is slidable in the yoke member 95, the latter can still continue its downward movement. When the platen 17 has reached its lowermost position, the control member of Figure 9 has reached the position shown in Figure 9u. The pump 14 is now reversed so as to cause the platen 17 to move upwardly.

Upward movement of the platen 17 also causes the yoke member 95 to move upwardly. As a result thereof, the yoke member 95, after a predetermined portion of the upward stroke has been completed, engages the flange 92 and carries it upwardly. A certain time thereafter the upper ends of the arms 97 engage the lower surface of the collar 91 so that further upward movement of the platen and, thereby, of the yoke member 95 lifts the push rod 84. This lifting movement is conveyed through the lever 87 and links 88, 89, to the control rod 90 for the control member of the pump 14, thereby causing the pump to move to neutral or no delivery position. The pump then comes to a halt, causing the platen likewise to stop.

Figure 9v shows the position of the yoke member 95 and push rod 84 shortly before the end of the partial retraction stroke, i. e., when the platen 17 has reached the point v in Figure 21.

By means which will later be described, the pump 14 now is moved beyond neutral position to full delivery forward stroke position so that the platen 17 and thereby the yoke member 95 again start to move downwardly. Before the platen approaches its lowermost position, the flange 100 again engages the bed 11 and the sleeve 93 is again stopped by the sleeve 99. While the platen and thereby the yoke member 95 continue to move downwardly, the inner surfaces of the arms 97 again slide over the collar 91 and spread. However, in contrast to the movement from Figure 9t position to Figure 9u position, the platen comes to a halt before the arms 97 can pass below the collar 91. The control mechanism then occupies the position shown in Figure 9x.

The pump 14 is now again reversed, thereby causing the platen to start its retraction stroke. As a result thereof, the yoke member 95 is carried upwardly, but since this time the arms 97 are held in spread position until their upper ends have moved above the collar 91, the arms 97 cannot engage the collar 91. Consequently, the yoke member 95, together with the arms 97, performs a complete retraction stroke, in contrast to the partial retraction stroke illustrated in Figure 9v.

Figure 9z shows the control member shortly before it has reached its uppermost position. The various positions of Figure 9 are indicated in the graph of Figure 21, illustrating the platen travel.

Hydraulic circuit

Referring to Figure 20 diagrammatically illustrating the hydraulic circuit of the press according to the invention, the press cylinder 102 is connected by means of a conduit 103 with one side of the variable delivery pump 14, the other side of which is connected by means of a conduit 104 with push back cylinders 105 having reciprocably mounted therein push back plungers 106 connected with the platen 17 for performing the retraction stroke of the platen. The platen 17 has connected thereto cams 107 and 108, of which the cam 107 is adapted to control a lever mechanism, generally designated 109, which in its turn controls the operation of a three-way valve 110 of standard design.

The three-way valve 110 is connected with a conduit 111 leading to the push back cylinders 105. A further conduit 112 connected with the three-way valve 110 leads to the cylinders of the jacks 40, which are interconnected with each other through the conduit 113. The third conduit 114 connected with the three-way valve 110 communicates with a conduit 115 comprising a check valve 116 and leading to the surge tank 16. The check valve 116 allows fluid to flow from the conduit 114 into the tank 16 but not in the reverse direction.

To allow manual operation of the three-way valve 110, the lever mechanism 109 is connected with a member 117 continuously urged into the position shown in Figure 20 by means of a spring 118, the lower end of which abuts the member 117, whereas the upper end of the spring 118 contacts a stationary abutment 119. The member 117 is connected with a rod 120 passing through the spring 118 and connected with a cable 121 passing over rolers 122 and 123 and connected with an arm 124, one end of which is pivoted at 125, while the other end of the arm 124 is connected with a handle 126. Consequently, pulling the handle 126 downwardly will compress the spring 118 for shifting the lever mechanism 109, thereby actuating the three-way valve 110. The three-way valve 110 may be controlled so as selectively to effect or interrupt hydraulic communication between the push back cylinders 105 and the jacks 40.

The cam 108 is adapted to actuate a lever mechanism generally designated 127, which controls a four-way valve 128 of standard design. The four-way valve 128 is connected with the conduit 115, and is furthermore connected with the conduits 56 and 57. A conduit 129 connected with the four-way valve 128 leads to an auxiliary pump 130, which may be of any desired type, i. e., either a constant delivery pump or a variable delivery pump.

The suction side of the pump 130 is connected with a conduit 131 leading to the tank 16. Mounted in the fluid tank 16 is a main cylinder release and pump by-pass valve 132, which is connected by means of a conduit 133 with a conduit 134 leading to the conduit 135, which latter is connected to the conduit 104. The conduit 135 which comprises a check valve 136 leads to the fluid tank 16. The check valve 136 allows fluid to pass from the tank 16 to the conduit 104 but not in the reverse direction.

The conduit 134 comprises a pressure relief valve 137 for releasing excessive pressure in the conduit 134 and is connected through a surge valve 138. The surge valve 138 is preferably of the type disclosed in Patent 2,193,248 to Ernst, and its main purpose consists in pre-filling the cylinder 102 when the press ram moves downwardly by gravity during the first portion of the working cycle. The valve 132 is furthermore connected, by means of a conduit 139, with a conduit 140 comprising a pressure relief valve 141 and leading to the conduit 103.

The main cylinder release and pump by-pass valve 132 does not form a part of the present invention and for a more detailed description thereof, reference may be had to U. S. patent application No. 286,063 to Ernst, filed July 24, 1939. The purpose of the main cylinder release and pump by-pass valve 132 consists in facilitating the initiation of the retraction stroke by releasing pressure from the main cylinder 102.

Also connected with the conduit 103 is a conduit 142 leading to a tonnage control valve 143, which may be of any desired design, preferably of the type disclosed in Patent No. 2,224,957 to Ernst.

The lever mechanism 127 is continuously urged into the position shown in Figure 20 by a spring 144. The valve 128 may, if desired, also be operated manually by actuation of the handle 145, which is connected to the cam arm 146 pivotally connected to a support 147 carried by the four-way valve 128. The operation of the four-way valve 128 controls the supply of pressure fluid to and the exhaust of pressure fluid from the die carrier shifting cylinders 53 and 55.

*Automatic control of three-way valve*

Referring to Figure 10, the cam 107 connected to the platen 17 comprises a cam surface 148 which is located in the same plane as the roller 149 rotatably supported by the arm 150 of the lever mechanism 109. The cam 107 furthermore comprises a cam surface 151 which is located in the same plane as the roller 152 rotatably supported by the arm 153 pivotally connected at 154 to the arm 150.

The cam 107 also comprises a surface 155, which is offset with regard to the cam surface 151 so as to allow the roller 152 freely to swing from one position into another position without engaging the surface 155. The arm 153 has a recess 156 which is adapted to receive a pin 157 rigidly connected to the lever arm 150, thereby preventing further clockwise movement of the arm 153. The pivot point 154 of the arm 153 is so arranged that the arm 153 is urged by its own weight to rotate in clockwise direction.

Figure 12:
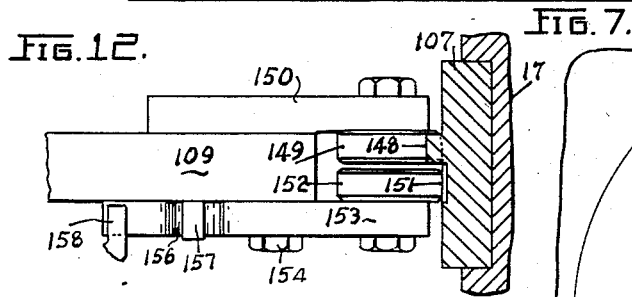

The left end of the arm 153, with regard to Figures 10 and 12, is continuously engaged by the upper end of the stop member 158 carried by the casing of the three-way valve 110. The valve member 159 of the three-way valve 110 is pivotally connected to the arm 150 by means of a pivot 160. The arm 150 has furthermore pivotally connected thereto a link 161, which in its turn is pivotally connected to the casing of the three-way valve 110. The control mechanism of Figure 10 operates as follows:

Supposing that the platen 17, and thereby the cam 107, is moving downwardly, starting from Figure 10a position, the slant surface 162, which in Figure 10a position engages the roller 149, will first move the said roller downwardly, thereby shifting the lever arm 150 in clockwise direction about the pivot 160 so that the valve member 159 will be moved downwardly. When the arm 150 during this shifting movement has reached a predetermined point, the roller 149 engages the cam surface 148 and rolls on this cam surface during the further downward movement of the platen 17.

Since the left upper surface of the lever arm 153 is prevented from moving upwardly by the stop member 158, the shifting movement of the arm 150 causes the roller 152 to move downwardly until the pin 157 carried by the arm 150 is fully received by the recess 156 of the lever arm 153. This position is shown in Figure 10b, from which it will be noted that the roller 152 just engages the cam surface 151 while the roller 149 is still in engagement with the cam surface 148. By means later to be described, the movement of the platen is now reversed so that it moves upwardly.

Since now the arm 153, due to the engagement of its roller 152 with the cam surface 151, cannot shift in anti-clockwise direction, it maintains the position shown in Figure 10b and, due to its connection with the arm 150, also forces the latter to remain in the position shown in Figure 10b. However, since the platen 17 moves upwardly, the cam surface 148 disengages the roller 149. The device is then in the position of Figure 10c. It will be noted that in this position the arm 153 holds the lever arm 150 in position, while in the first two phases, Figures 10a and 10b, the lever arm 150 moved the arm 153 into position. When the platen 17 now continues its upward movement and has reached a predetermined position, the cam surface 151 finally disengages the roller 152 so that the spring 118 (Figure 20) shifts both arms 150 and 153 in anti-clockwise direction, thereby returning the same to their initial position as shown in Figure 10d.

*Automatic control of four-way valve*

Referring to Figure 11, the cam 108 carried by the platen 17 comprises a cam surface 163 located in the same plane as and adapted to cooperate with the roller 164 rotatably supported by the arm 165 which, by means of pivot 166, is pivoted to the lever arm 167 of the lever mechanism 127. The cam 108 furthermore comprises a cam surface 168 located in the same plane as and adapted to cooperate with the roller 169 rotatably supported by the lever arm 170, which latter is pivotally connected to the lever arm 167 likewise by means of the pivot 166.

Figure 13:
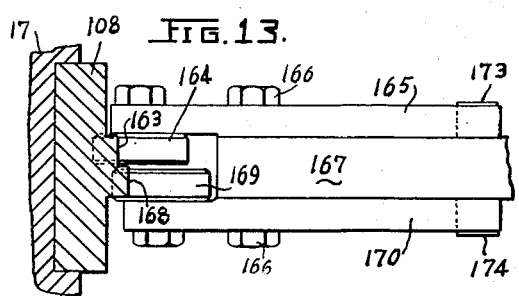
Figure 13 is a view along the line 13—13 of Figure 11m.

Each of the arms 165, 170 has, at one end thereof, a recess 171, 172, respectively adapted to engage correspondingly shaped abutments 173 and 174 (Figure 13). The lever arm 167 is pivotally connected to a link 175 which in its turn is pivotally connected by means of the supporting arm 176 to the casing of the four-way valve 128. The arm 167 is furthermore pivotally connected by means of the pivot 177 to the valve plunger 178. The control device of Figure 11 operates in the following manner:

Supposing that the platen 17, the cam 108 and the lever mechanism 127 are in the position of Figure 11m, and that the platen 17 now starts a downward stroke. Downward movement of the platen also causes a downward movement of the cam 108 so that the slant cam surface 179, due to its engagement with the roller 164, shifts the latter about the pivot 166 so that it will engage the cam surface 163. When the lever arm 165 has been so moved, it disengages the abutment 173.

Furthermore, movement of the cam 108 has, at this time, brought the cam surface 168 into engagement with the roller 169 and, thereby, shifted the lever arm 170 likewise about the pivot 166. The lever mechanism 127 then occupies the position of Figure 11n. The pivot 166 is so arranged with regard to the lever arms 165 and 170 that the said arms, by their own weight, tend to rotate in clockwise direction.

Further downward movement of the platen 17 causes the roller 169 to disengage the cam surface 168 and to return into its horizontal position as shown in Figure 11o, while the roller 164 engages the cam surface 163. When the platen is now reversed, the cam surface 168 again engages the roller 169 but this shifts the same upwardly and, since the arm 170 engages the abutment 174, it also causes the lever arm 167 to shift in clockwise direction about the pivot 177. This shifting movement of the lever arm 167 moves the valve plunger 178 to its lowermost position.

The last mentioned shifting movement of the lever arm 167 carries the arm 165 upwardly but while the roller 164 in this uppermost position in Figure 11p does not yet engage the cam surface 163, the roller 169 engages the cam surface 168. If now the platen 17 is again moved downwardly, the roller 164 comes into engagement with the cam surface 163, thereby maintaining the lever arm 167 so shifted that the valve plunger 178 stays in its lowermost position. However, the roller 169 disengages the cam surface 168 but still remains in its previous position. The control system then occupies the position of Figure 11q.

If the platen 17 now moves upwardly, the cam surface 168 will merely pass beneath the roller 169 without causing any change in the position of the levers, and when the cam surface 168 has passed beyond the roller 169, the lever arms 165 and 170 are free to return to their horizontal position and are so returned by means of the spring 144. The control mechanism then occupies the position of Figure 11r.

The different positions of the control mechanisms of Figures 10 and 11 are also indicated in the graph of Figure 21.

Electric circuit

Figure 15:
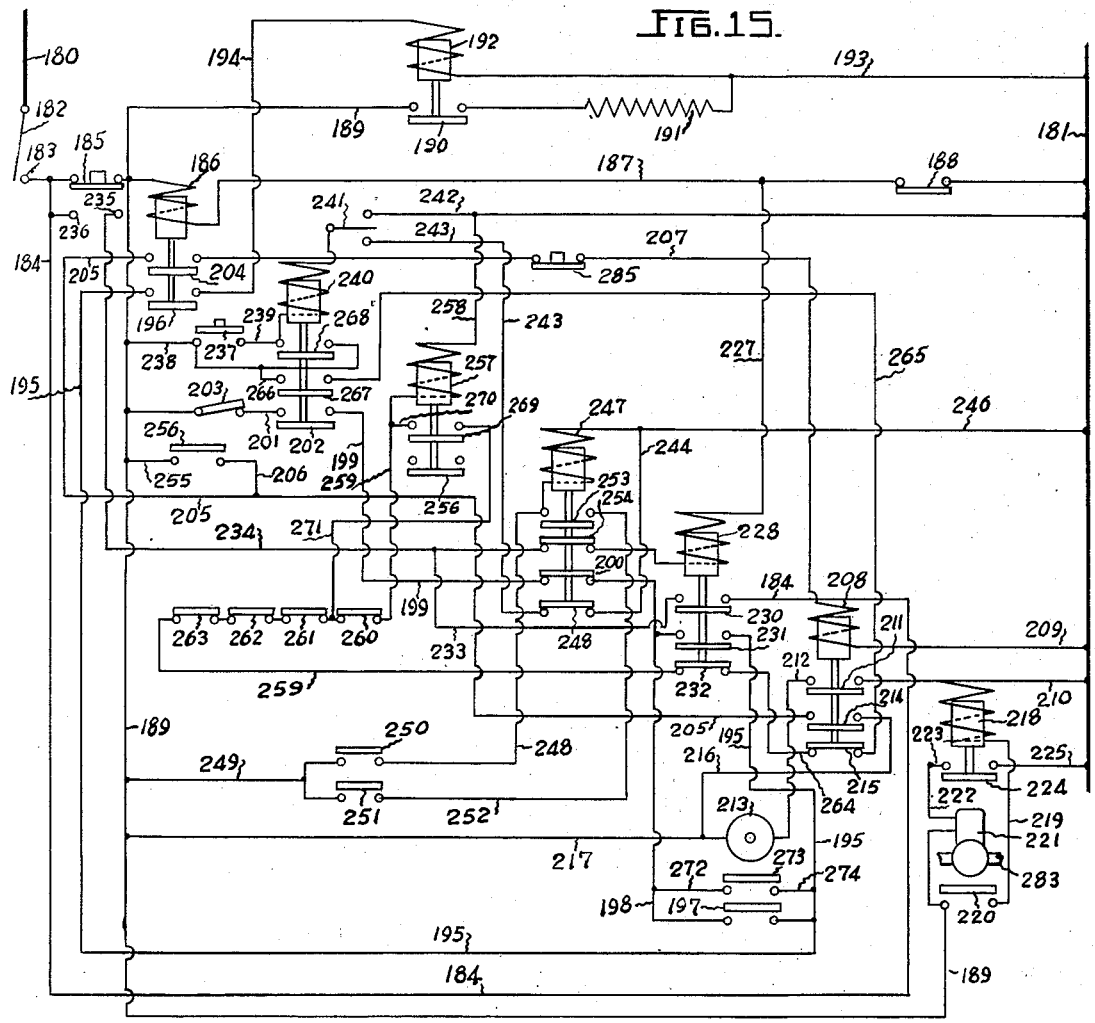
Figure 15 is a more elaborate wiring diagram corresponding to the wiring diagram of Figure 14 but omitting the energizing circuit for the driving motor.

Referring to Figure 15, 180 and 181 designate the main supply lines. Connected with the main supply line 180 is a switch arm 182 adapted when in closed position to contact the terminal 183 which is connected to the line 184. Also connected with the line 184 is a normally closed cycle stop switch 185 which in its turn is connected with the solenoid 186. The solenoid 186 is connected by line 187 with the normally closed tonnage control switch 188 provided in the tonnage control valve 143 and connected to the main supply line 181. Also connected with one end of the solenoid 186 is a line 189 adapted to be connected by a switch blade 190 with the pump solenoid 191, the energization of which controls the movement of the pump 14 to full delivery forward stroke position.

The operation of the switch blade 190 is controlled by the solenoid 192, one end of which is connected with the pump solenoid 191 and the main supply line 181 by line 193. The other end of the solenoid 192 is connected to a line 194 adapted to be connected with the line 195 by means of the switch blade 196. The line 195 is adapted to be connected by means of the die limit switch blade 197 with the line 198 connected to the line 199 by the normally closed switch blade 200. The die limit switch blade 197 is opened when the lower die 44 is in alignment with the mold bore 43. This opening is effected by a cam 226 (Figure 16). The line 199 is adapted to be connected with the line 201 by means of the switch blade 202. The line 201 comprises a normally closed ram switch 203 and leads to the line 189. The solenoid 186 controls, in addition to the switch blade 196, the switch blade 204 adapted to interconnect the line 205 with the line 207 which comprises a normally closed switch 285 and is connected to one end of the solenoid 208, the other end of which is connected by line 209 with the main supply line 181. Also connected with the main supply line 181 is a line 210 adapted to be connected by means of the switch blade 211 with the line 212 leading to a timer 213. The switch blade 211 is controlled by the solenoid 208, which also controls the switch blades 214 and 215. Closure of the switch blade 214 interconnects the line 216 leading to the line 217 with the line 205.

Also connected with the line 210 is one end of a solenoid 218, the other end of which is connected to a line 219 adapted to be connected with the line 189 by closure of the normally open switch blade 220. The switch blade 220 is closed by the cam 226, while the lower die 44 is moved into alignment with the mold bore 43, i. e., is moving from the position of Figure 19 to the position of Figure 16.

The line 189 leads to the solenoid valve 221, which latter is connected by means of line 222 to a line 223 adapted by closure of the switch blade 224 to be connected with the line 225 leading to the main supply line 181.

Connected with the line 187 is a line 227 leading to one end of the solenoid 228, the other end of which is connected to a line 229. The solenoid 228 controls the normally open switch blades 230, 231 and the normally closed switch blade 232. The switch blade 230 controls the interconnection of lines 184 and 233, the latter of which is connected to the line 234 leading to the terminal 235. The terminal 235 may be connected with the terminal 236 connected to the line 184.

The cycle start switch is designated 237 and when in closed position is adapted to connect the line 238 with the line 239 leading to one end of the solenoid 240. The other end of the solenoid 240 is connected with the switch arm 241 adapted selectively to be connected with the line 242 or line 243, depending on whether full automatic or semi-automatic operation is desired.

The line 243 is connected with a line 244 by the normally closed switch blade 245. The line 244 is connected to the line 246 which, on one hand, leads to the main supply line 181 and, on the other hand, is connected to one end of the solenoid 247. The other end of the solenoid 247 is connected to a line 248 adapted to be connected with the line 249 by closure of the switch blade 250. The line 249 which leads to the line 189 is adapted to be connected by means of the switch blade 251 with the line 252 which in its turn may be connected with the line 248 by closure of the switch blade 253. The solenoid 247 controls, in addition to the blades 200, 245 and 253, also the normally closed switch blade 254. The switch blade 254, when closed, connects the lines 229 and 234.

Also connected with the line 189 is a line 255 adapted by closure of the switch blade 256 to be connected with the line 206 leading to the line 205.

The numeral 257 designates a solenoid having one end thereof connected to the line 258 which leads to line 242, while the other end of the solenoid 257 is connected to a line 259 comprising limit switches 260, 261, 262 and 263. The limit switch 260 is normally closed when the scale is full, while the limit switch 261 is normally closed when the lower die 44 is in alignment with the mold bore 43. The limit switch 262 is normally closed when the mold is in its lowermost position, and the limit switch 263 is normally closed when the press plunger 19 is in its uppermost position (Figure 16).

The line 259 is normally connected with the line 264 through the normally closed switch blade 232. The line 264 is connected through the normally closed switch blade 215 with the line 265 which in its turn may be connected to the line 266 by closure of the switch blade 267 which is controlled by the solenoid 240. The line 266 is connected to the line 238, which latter may be connected with the line 239 by closure of switch blade 268.

The solenoid 257 controls the normally open switch blade 269 which is adapted, when closed, to connect the line 270 with the line 271 connected in its turn with one terminal of each of the switches 260 and 261.

Connected with the line 198 is a line 272 adapted by closure of the switch blade 273 to be connected with line 274 which leads to the line 195.

Figure 14:
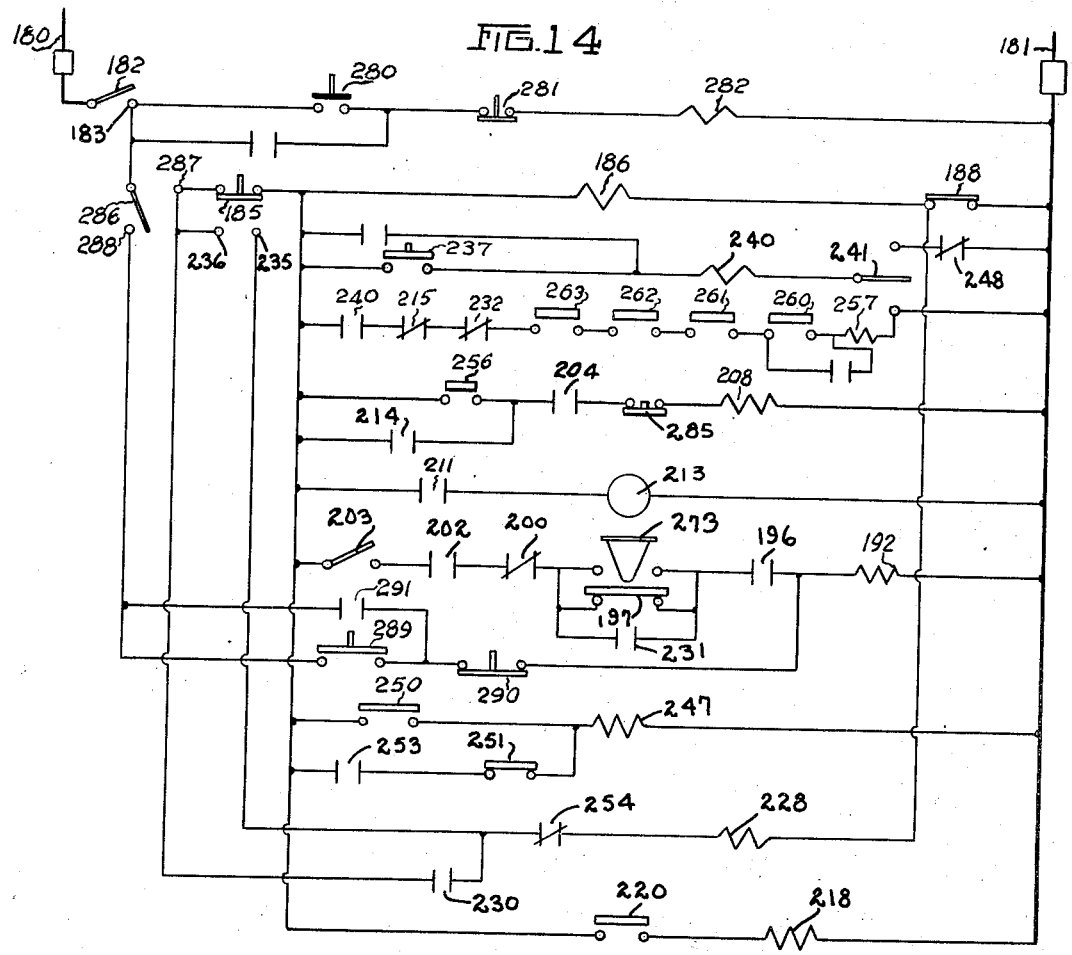
Figure 14 is a simplified wiring diagram for the electric circuit associated with the press according to the invention.

The detailed electric circuit of Figure 15 is illustrated in a simplified diagram in Figure 14, in which the corresponding parts are designated with the same reference numerals as in Figure 15. The diagram of Figure 14 moreover comprises an additional circuit for the electric motor driving the main pump 14. This circuit comprises a starter switch 280, a normally closed stop switch 281 and a starter solenoid 282.

Energization chart:

The chart of Figure 22 has plotted as ordinates the travel of the platen 17 and the numbers of the electric control solenoids, whereas the time of travel of the platen 17 and the period of energization of the said solenoids are plotted as abscissae.

By consulting this chart, it is possible immediately to determine the state of energization of all solenoids at any random point of travel of the platen.

Supposing it is desired to find out which solenoids are energized and which solenoids are not energized at the position IV of the platen, i. e., at the position when the platen is just beginning to start the first downward stroke of a cycle. Following the vertical line downwardly from position IV, it will be noted that this vertical line cuts through the horizontal energization lines pertaining to the solenoids 186, 240 and 208, which indicates that these solenoids were already energized prior to the position IV and still remain energized.

The said vertical line furthermore touches the beginning of the horizontal energization lines pertaining to solenoids 192, 191, which indicates that at this time the solenoids 191 and 192 have just been energized.

Since the energization lines pertaining to the solenoids 257, 247 and 218 are not crossed nor touched by the said vertical line, the solenoids 257, 247 and 218 are not energized in the position IV of the platen.

To sum up the situation, a glance at the chart of Figure 22 shows that at the position IV of the platen 17, the solenoids 186, 240, 208, 192 and 191 are energized, whereas the solenoids 257, 247 and 218 are not energized.

Similarly, examining the situation when the platen is in the position V, i. e., is about to start its partial retraction stroke, it will be noted that the solenoids 191, 192 and 208 have just reached the end of their energization period, in other words, are now deenergized, whereas the solenoid 240 is still energized. The chart also indicates that at the position V the solenoid 186 reaches the end of one energization period and immediately thereafter starts a new energization period. This last mentioned feature is due to the fact that the tonnage control switch 188 is open for a very short time and closes immediately after the pressure in the press cylinder 102 decreases. In addition to the solenoids just mentioned, the chart also indicates that at the position of Figure 5 of the platen, the solenoids 257, 247 and 218 are not energized.

It will also be noted that the chart of Figure 22 indicates at a glance during which period of time of travel of the platen, or between which points of travel of the platen, the various solenoids are energized and not energized respectively. For instance, considering solenoid 192, it will be noted that this solenoid is energized when the platen starts its first downward stroke during a cycle, i. e., in position IV, and then stays energized until the platen has reached the position IV, i. e., is about to start its partial retraction stroke.

The chart shows furthermore that when the platen has reached position VI and is about to start its shortened downward stroke, the solenoid 192 is again energized and stays energized until the end of this shortened downward stroke, in other words, until the platen has reached position VII.

OPERATION

Semi-automatic operation

The operation of the press will be best understood in connection with Figures 21 and 22, of which Figure 21 shows the points at which, during the travel of the platen, the various mechanical controlling means are actuated, while Figure 22 shows at which points of the travel of the platen the electric control solenoids are actuated.

Assuming now that the press is in the position of Figure 12 with the automatic control for the three-way valve 110 in the position of Figure 10a and the automatic control for the four-way valve 128 in the position of Figure 11m; assuming further that the mechanical control for the variable delivery pump 14 is in the position of Figure 9a, while the mold 29 and the lower die 44 are in the position diagrammatically indicated in Figure 16, and that it is now desired to perform a single working cycle, in other words, to start the press for semi-automatic operation.

To this end the operator shifts the switch arm 241 so as to cause the latter to interconnect the solenoid 240 with the line 243. The operator then starts the auxiliary pump 130 and closes the switch 280 (Figure 14) to start the motor driving the pump 14. Thereafter the operator moves the switch arm 182 into closed position (Figure 15) and furthermore closes the cycle start switch 237.

This will cause current to flow from the main supply line 180 through switch arm 182, cycle stop switch 185, solenoid 186, line 187, tonnage control switch 188 and main supply line 181. As a result thereof the solenoid 186 is energized and causes the switch blades 204 and 196 to move to closed position. Closure of the switch blades 204 and 196 at this time does not close any circuits.

Current will furthermore flow from the main supply line 180 through the switch arm 182, the cycle stop switch 185, line 189, closed cycle start switch 237, solenoid 240, line 243, switch blade 245, lines 244 and 246 and the main supply line 181. As a result thereof the solenoid 240 is energized and causes the switch blades 268, 267 and 202 to move into closing position. Closure of the switch blade 268 establishes a holding circuit for the solenoid 240, which holding circuit comprises the main supply line 180, cycle stop switch 185, line 189, line 238, switch blade 268, solenoid 240, switch arm 241, line 243, the normally closed switch blade 245, line 244 and line 246.

Closure of the switch blade 267 establishes a circuit comprising line 180, switch arm 182, cycle stop switch 185, line 189, line 238, line 266, switch blade 267, line 265, closed switch blade 215, line 264, closed switch blade 232, line 259, now closed limit switches 263, 262, 261, 260, solenoid 257, line 258, line 242 and main supply line 181. This circuit causes energization of the solenoid 257 which in its turn trips a scale 275 (Figure 16).

The scale 275 is adapted to measure a predetermined quantity of molding material, such as salt, and has connected thereto a chute 276 which is shiftable about the stationary pivot 277. Tripping of the scale 275 by the solenoid 257 allows the salt to flow from the scale through the chute 276 into the mold 29. When the scale 275 is about empty, the weight 278, by means of the linkage 279 connected to the chute 276, shifts the latter into Figure 16 position. This movement causes the switch blade 260 to open which, however, does not affect the energization of the solenoid 257 since the switch blade 260 is by-passed by the line 271. Furthermore, due to the said movement, the weight 278 closes the switch blade 256.

Closure of the switch blade 256 establishes a circuit comprising the main supply line 180, cycle stop switch 185, lines 189 and 255, blade 256, lines 206 and 205, now closed blade 204, line 207, solenoid 208, line 209 and main supply line 181. This circuit energizes the solenoid 208 so that switch blades 211 and 214 move into closing position whereas the switch blade 215 opens. Opening of the switch blade 215 breaks the energizing circuit for the scale tripping solenoid 257 so that the switch blade 269 opens. Closure of the switch blade 214 establishes a holding circuit for the solenoid 208, which holding circuit comprises the main supply line 180, switch arm 182, cycle stop switch 185, line 189, lines 217 and 216, switch blade 214, line 205, now closed blade 204, line 207, solenoid 208, line 209 and main supply line 181.

Closure of the switch blade 211 closes the energizing circuit for the timer 213, which circuit comprises main supply line 180, switch arm 182, cycle stop switch 185, line 189, line 217, timer 213, line 212, switch blade 211, line 210 and main supply line 181.

At the end of the time for which the timer 213 has been set, the timer switch blade 273 is closed. This establishes a circuit comprising the main supply line 180, switch arm 182, line 189, ram switch 203, the now closed switch blade 202, line 199, switch blade 200, lines 198 and 272, timer switch blade 273, lines 274 and 195, now closed switch blade 196, line 194, solenoid 192, line 193 and main supply line 181.

Energization of the solenoid 192 causes the switch blade 190 to close, thereby closing the energizing circuit for the pump solenoid 191, which circuit comprises the main supply line 180, switch arm 182, cycle stop switch 185, line 189, switch blade 190, pump solenoid 191, line 193 and main supply line 181. Energization of the pump solenoid 191 actuates, by means of the linkage 88, 89 (Figures 9 and 20), the flow control member of the pump 14 so as to shift the latter to full delivery forward stroke position.

Pressure fluid is now delivered by the pump 14 through the conduit 103 into the upper portion of the press cylinder 102, while fluid is withdrawn from the push back cylinders 105 through the conduit 104 to the suction side of the pump 14. The press ram 13 now moves downwardly by gravity and the fluid delivered by the pump 14 through the conduit 103 into the press cylinder 102 is supplemented by fluid from the fluid tank 16, which fluid passes through the surge valve 138. While the ram 13 and the pressing plunger 19 connected thereto are moving downwardly, the switch blade 263 opens and the scale 275 is again filled with salt. When the scale is completely filled, it overcomes the weight 278 so that the chute supporting the scale moves from the position of Figure 16 into the position of Figure 17, thereby opening the switch blade 256. Opening of the switch blade 256 deenergizes the solenoid 208, thereby breaking the energizing circuit for the timer 213. As a result thereof the timer switch blade 273 opens and the timer is reset.

When the pressing plunger 19 during its downward movement has reached the position of Figure 17, it has already partially compressed the salt in the mold, which latter, due to the friction between the salt and the mold, has likewise been moved downwardly against the thrust of the spring 39, which previously held the mold in its normal upper or idle position. The downward movement of the mold 29 also expels fluid from the jacks 40 through the conduit 112, the three-way valve 110, the conduit 114 and the conduit 115 into the tank 16 until the platen 17 has reached the point indicated b in the graph illustrated in Figure 21. When the pressing plunger 19 engages the salt in the mold, pressure builds up in the press cylinder 102 and the surge valve 138 closes.

When the platen 17 has moved from the position a to the position b in Figure 21, the cam 107 of the platen 17 has shifted the three-way valve 110 from Figure 10a position into Figure 10b position in the manner previously described under "Automatic control of three-way valve." This shifting movement of the three-way valve 110 breaks the connection between the conduit 112 and the conduit 115 and establishes hydraulic connection between the conduit 112 and the conduit 111 connected to the push back cylinders 105. The jacks 40 and the push back cylinders 105 then remain interconnected during the present downward stroke of the platen 17. During the same downward stroke, the four-way valve 128 stays in the position shown in Figure 20, in which fluid pressure from the pump 130 is conveyed through conduit 129, four-way valve 128 and conduit 57 into the die carrier shifting cylinder 55, while the four-way valve 128 simultaneously interconnects the conduit 56 connected with the die carrier shifting cylinder 53 with the exhaust line 115.

During this downward stroke of the platen 17 which is illustrated by the portions s-t-a-b-m-n-u in the graph of Figure 21, the push or control rod 84 moves from Figure 9s position into Figure 9u position, in the manner previously described under "Mechanical control for variable delivery pump."

When the salt has been compressed to a desired extent, a predetermined pressure has built up in the press cylinder 102, which pressure is conveyed through the conduits 103 and 142 to the tonnage control valve 143 so that the tonnage control switch 188 opens. Opening of the tonnage control switch 188 breaks the energizing circuit for the solenoid 186 so that the switch blades 204 and 196 open.

Opening of the blade 196 breaks the energizing circuit for the solenoid 192 so that also the blade 190 opens, which latter breaks the energizing circuit for the pump solenoid 191. As a result thereof a spring in the pump 14 shifts the pump to full delivery retraction stroke position so that pressure fluid is now passed through conduit 104 into the push back cylinders 105 and since the latter, as previously mentioned, at this time are hydraulically connected with the jacks 40, also the latter receive pressure fluid from the pump 14. On the other hand, fluid is passed from the press cylinder 102 through the line 103 to the now suction side of the pump 14. The platen 17 now starts an upward stroke however; as the result of the mechanical linkage shown in Figure 9, the platen will make only a partial retraction stroke, as explained in detail under "Mechanical control for variable delivery pump."

Shortly after the tonnage control switch 188 had opened and a part of the pressure in the main cylinder 102 was released, the tonnage control switch 188 closes again, thereby closing the energizing circuit for the solenoid 186. Energization of the solenoid 186 again closes the switch blades 196 and 204 which, however, has no effect at this time.

During the first phase of this partial retraction stroke, the cam 108 begins to actuate the arms 165 and 170 so as gradually to shift the four-way valve 128 in the manner previously described under "Automatic control for four-way valve." Prior to the beginning of this shifting movement, the mold 29 has been lifted by the springs 39, loaded during the downward stroke of the mold, and the jacks which, as previously mentioned, are at this time hydraulically connected with the push back cylinders 105 so that they also receive pressure fluid from the pump 14. It will be noted that the jacks 40 lift the mold 29 higher than the springs are able to lift the mold. The mold 29 has been lifted to such an extent that lateral movement of the lower die 44 is not impeded by the lower portion of the mold 29.

When the retraction stroke of the platen 17 has proceeded to such an extent that the platen has reached the point $p$ of the graph illustrated in Figure 21, the arms 97 of the mechanical linkage in Figure 9 have, by means of the push rod 84 and lever 86, shifted the pump 14 to neutral or no delivery position so that the press comes to a halt as previously explained under "Mechanical control for variable delivery pump."

When, during the partial retraction stroke of the platen, the mold 29 has cleared the lower die 44, the cam 108 in the manner previously described under "Automatic control for four-way valve," actuates the lever arms 165 and 170 so as to start the shifting movement of the four-way valve 128. Consequently, fluid pressure from the low pressure pump 130 passes through the conduit 129, the four-way valve 128 and conduit 56 into the die carrier shifting cylinder 53. Simultaneously the line 57 connected to the die carrier shifting cylinder 55 has been connected by the four-way valve 128 with the exhaust line 115. As a result thereof the pressure fluid delivered by the pump 130 starts to shift the die carrier shifting plunger 51 to its right end position with regard to Figure 18, thereby moving the lower die 44 out of alignment with the mold 29, while moving the mold supporting blocks 294 beneath the mold.

During this movement the cam 226 releases the switch blade 251 so that the spring 284 (Figures 16 and 18) closes the switch blade 251. This has, however, no effect at this time since the switch blade 253 pertaining to the solenoid 247 is open. Furthermore, the lower die 44 releases the switch blade 261 so that the latter opens.

When the platen 17, during its partial retraction stroke, has reached the point $p$ of Figure 21, which point indicates the end of the partial retraction stroke, the arms 165 and 170 are in the position of Figure 11$p$, in which position they have fully shifted the four-way valve 128. The die carrier shifting plunger 51 then completes its rightward movement with regard to Figure 4 and, as soon as the lower die 44 has arrived at its right hand end, the lower die 44 closes the die limit switch blade 197.

Since, as previously mentioned, the switch blade 196 was closed again shortly after the initiation of the partial retraction stroke and since at this time the solenoid 240 is still energized so that the switch blade 202 is closed, closure of the switch blade 197 establishes a circuit comprising main supply line 180, switch arm 182, cycle stop switch 185, line 189, ram switch 203, closed switch blade 202, line 199, blade 200, line 198, now closed limit switch blade 197, line 195, now closed blade 196, line 194, solenoid 192, line 193 and main supply line 181. In this way the solenoid 192 is again energized, thereby causing switch blade 190 to close which in its turn re-energizes the pump solenoid 191. As a result thereof the pump 14 is again shifted on forward stroke so that the platen 17 moves downwardly.

Since the lower die 44 is still out of alignment with the mold bore 43, the plunger 19 during its present downward stroke ejects the salt block as indicated in Figure 19. The downward stroke of the platen 17 also moves the yoke member 95 downwardly which, shortly before the end of the downward stroke, occupies the position indicated in Figure 9$x$, as previously explained under "Mechanical control for variable delivery pump." However, the three-way valve 110 and the four-way valve 128 remain in their respective positions, as previously explained under "Automatic control of three-way valve" and "Automatic control of four-way valve." Although during this second forward stroke the jacks are still connected with the push back cylinders 105 which are now again connected to the suction side of the pump 14, the mold cannot move downwardly upon the die 44 since it is held in spaced relation from the die 44 by the supporting blocks 294.

When, during this downward stroke of the plunger 19 the salt block 293 has been ejected, the platen 17 or an arm connected thereto closes the limit switch blade 250, thereby establishing a circuit comprising the main supply line 180, switch arm 182, cycle stop switch 185, line 189, line 249, now closed switch blade 250, line 248, solenoid 247, line 246 and main supply line 181. As a result thereof the solenoid 247 is energized. Energization of the solenoid 247 closes the switch blade and opens the switch blades 254, 200 and 245.

Closure of the switch blade 253 establishes a holding circuit for the solenoid 247, which circuit comprises the main supply line 180, switch arm 182, cycle stop switch 185, line 189, now closed switch blade 251, line 252, now closed blade 253, solenoid 247, line 246 and main supply line 181. Opening of the switch blade 254 has no effect at this time since the terminals 235 and 236 are open.

Opening of the switch blade 200 breaks the energizing circuit for the solenoid 192 so that the solenoid 192 is deenergized and opening of the switch blade 245 breaks the holding circuit for the solenoid 240 so that also the latter is deenergized. As a result thereof also the pump solenoid 191 is deenergized so that the spring in the main pump 14 is again shifted to full delivery retraction stroke position. The platen 17, therefore, again starts a retraction stroke which, however, in contrast to the previous partial retraction stroke, is a complete retraction stroke.

Soon after the initiation of the last mentioned retraction stroke of the plunger 19, the cam 108 releases the roller 164 (Figure 11) so that the spring 144 returns the four-way valve 128 to its initial position as previously described under "Automatic control of four-way valve" and illustrated in Figure 11r.

This shifting movement of the four-way valve 128 connects the die carrier shifting cylinder 53 with the exhaust line 115 and the die carrier shifting cylinder 55 with the pressure line 129. Consequently, fluid pressure from the low pressure pump 130 enters the cylinder 55, thereby moving the lower die 44 again into alignment with the mold bore 43. By this time the springs 39 in the spring cylinders 38 and the jacks 40 have lifted the mold 29 substantially to its uppermost position so that the last mentioned shifting movement of the lower die 44 is not impeded.

While the lower die 44 is moved from its right end position into alignment with the mold bore 43, the cam 226 closes the switch blade 220, thereby closing the circuit comprising the main supply line 180, switch arm 182, cycle stop switch 185, line 189, now closed switch blade 220, line 219, solenoid 218, line 210 and main supply line 181. As a result thereof the solenoid 218 is energized and switch blade 224 closes, thereby closing the circuit through the solenoid valve 211, which circuit comprises the main supply line 180, switch arm 192, cycle stop switch 185, line 189, lines 222 and 223, now closed switch blade 224, line 225 and main supply line 181. As a result thereof the solenoid valve 221 is actuated so as to blow air from the pipe line 283 connected with any desired air pressure device over the die, thereby removing loose salt from the face of the die.

When the lower die 44 has been returned to its initial position in which it is in alignment with the mold bore 43 it again closes the switch blade 261, while the cam 226 has released the switch blade 220 so that the latter has opened again. As a result thereof the energizing circuit for the solenoid 218 is broken so that the solenoid 218 is deenergized.

Furthermore, when the lower die 44 is in alignment with the mold bore 43, the cam 226 has also opened the switch blade 251, thereby breaking the holding circuit for the solenoid 247 so that the latter is deenergized since previously the switch blade 250 was released by the platen 17 at the initiation of its retraction stroke and therefore had opened. Deenergization of the solenoid 247 causes the blade 253 to return to its open position and the blades 254, 200 and 245 to their closed positions, thereby reconditioning the circuit for a new cycle.

While the platen 17 is continuing its retraction stroke and approaching the point d indicated in Figure 21, the cam 107 begins to release the roller 152 so that the spring 118 (Figure 20) shifts the three-way valve 110 to its initial position as indicated in Figure 10d. When the three-way valve 110 has been so shifted, the jacks 40 are again disconnected from the push back cylinders 105 and connected with the surge tank 16. Consequently, the weight of the mold 29 moves the piston rods 80 of the jacks 40 (Figure 5) downwardly to a certain extent until the weight of the mold is balanced by the force of the springs 39, which now hold the mold 29 in the position of Figure 16. In this position the mold 29 closes the switch blade 262.

The platen now continues its retraction stroke until the yoke member 95 by means of the push rod 84 and lever 87 moves the pump 14 to neutral position, whereupon the press comes to a stop. At this time the pressing plunger 19 closes the switch blade 263 (Figure 16). The press is now ready for a new cycle.

*Full automatic operation*

If, instead of semi-automatic operation as described above, full automatic operation of the press is desired, the operator shifts the switch arm 241 so as to cause the same to interconnect the solenoid 240 with the line 242. The initiation of the pressing cycle and operation of the press will then be the same as described above. However, since now the switch arm 241 is connected with the line 242, opening of the switch blade 245 will not deenergize the solenoid 240, so that the latter stays energized during the entire retraction stroke and, consequently when, at the completion of the retraction stroke, the switch blades 263, 262, 261 and 260 are closed, a new cycle is automatically initiated. The press then performs any desired subsequent number of working cycles.

*Emergency operation*

If, during the pressing cycle before the salt block has been ejected, it is desired for some reason to interrupt the molding operation, the operator presses the cycle stop switch 185 so as to cause the latter to bridge the terminals 235 and 236. This immediately breaks the energizing circuit for the solenoid 186 so that the switch blade 196 opens and thereby breaks the energizing circuit for the solenoid 192. Deenergization of the solenoid 192 causes the blade 190 to open so that also the pump solenoid 191 is deenergized.

As a result thereof, the pump 14 is shifted to full delivery retraction stroke position and the platen is immediately returned to its starting point if it is on the first downward stroke, or it will immediately be returned to the midway point if the platen is on the second downward stroke during the same cycle.

If the cycle stop switch 185 should be operated while the platen is on its first upward stroke it will proceed to the midway point, or will proceed to the starting point if it is on its second upward stroke. The point at which the platen will stop is determined by the mechanical linkage of Figure 9.

At this actuation of the cycle stop switch 185 provided that it occurred before the salt block was ejected, the solenoid 247 is deenergized and the bridging of the contacts 235 and 236 will close a circuit, which circuit comprises the main supply line 180, switch arm 182, line 184, line 234, switch blade 254, solenoid 228, line 187, tonnage control switch 188 and main supply line 181. Consequently, the solenoid 228 is energized and the blades 230 and 231 close, while the blade 232 opens.

Closure of the switch blade 230 establishes a holding circuit for the solenoid 228, which circuit comprises the main supply line 180, switch arm 182, line 184, now closed switch blade 230, line 233, line 234, switch blade 254, line 229, solenoid 228, line 227, tonnage control switch 188 and main supply line 181. Opening of the switch blade 232 breaks the energizing circuit for the scale tripping solenoid 257 if the latter should be energized at such time.

Deenergization of the solenoid 257 causes the switch blade 269 to open. Consequently, when a new cycle is started by closing the cycle start switch 237 after the cycle stop switch 185 has returned to its normal position, the scale tripping solenoid 257 cannot be energized due to the opening of the switch blade 232 pertaining to the solenoid 228, thereby preventing that a new charge is added to the charge still in the mold.

However, closure of the cycle start switch 237 will immediately energize the solenoid 192 due to the fact that the closure of the cycle start switch 237 closes the circuit comprising the main supply line 180, switch arm 182, now again closed cycle stop switch 185, line 189, ram switch 203, now closed blade 202 (immediately closed after the solenoid 240 is energized, due to the closure of the cycle start switch 237), line 199, switch blade 200, line 198, now closed switch blade 196, line 194, solenoid 192, line 193 and main supply line 181. Consequently, also the pump solenoid 191 will be reenergized and the pressing plunger 19 put on forward stroke, and will continue its molding operation from that point on at which previously the molding cycle was interrupted. This operation will be effected regardless of whether the press is set for semi-automatic or full automatic operation.

Repeated tripping of the scale

If it is desired for some reason to fill a plurality of measured charges into the mold instead of one single charge before starting the molding operation, the ram switch 203 is opened. The cycle is then started in the usual manner by the cycle start switch 237 which, as previously described, causes energization of the solenoid 240 so that the switch blades 267 and 202 have closed, thereby energizing the scale tripping solenoid 257. As a result thereof a measured quantity of the molding material is unloaded into the mold. Since at the time the solenoid 257 is energized, the switch blade 256 is closed, also the solenoid 208 is energized as set forth under "Semi-Automatic Operation".

Energization of the solenoid 208, as likewise set forth above, opens the blade 215, thereby deenergizing the scale tripping solenoid 257. Inasmuch as the solenoid 208 stays energized due to the holding circuit established by the now closed switch blade 214, it is normally not possible to trip the scale again before a working cycle has been completed.

However, if it is desired to unload a new charge into the mold, it is merely necessary to open the switch 285 in the line 207, thereby breaking the energizing circuit for the solenoid 208 so that the switch blade 215 again moves into closing position, while the switch blades 211 and 214 pertaining to solenoid 208 open. If now the cycle start switch 237 is again closed, the cycle just described is repeated and a new batch of molding material is unloaded into the mold. The operation of the platen may then at any time be started by closing the ram switch 203.

Manually controlled semi-automatic operation

In order to enable operation of the platen 17 without the actuation of the automatic electric control system described above, a cycle on-off switch arm 286 is provided (shown only in circuit of Figure 14). If this arm is shifted so as to engage the terminal 287, a normal cycle with the operation of the control system may be obtained. However, if the platen is to be operated without the electric control system, the switch arm 286 is shifted so as to engage the terminal 288. If then the forward push button 289 is closed, current will flow from the main supply line 180, switch arm 182 (provided the arm 182 is closed), switch arm 286, terminal 208, push button 289, normally closed reverse button 290, solenoid 192 and the main supply line 181.

Energization of the solenoid 192 closes the switch 291 which establishes a holding circuit for the solenoid 192. Energization of the solenoid 192 furthermore causes energization of the pump solenoid 191 (Figure 15), which solenoid effects movement of the pump 14 into full delivery forward stroke position. As a result thereof, the press platen starts its forward stroke.

Whenever it is now desired to effect a return stroke of the platen, it is merely necessary to open the reverse button 290, thereby breaking the holding circuit of the solenoid 192 and deenergizing the pump solenoid 191. In the manner previously described, the pump 14 will then be reversed so that the platen 17 starts its retraction stroke.

Since the platen 17 due to its cams 107 and 108 still operates the mechanical controlling means of Figures 9, 10 and 11, the molding press of the present invention may, therefore, selectively be operated so as to perform its proper molding operations with or without the above described electric control system.

Summary of operation

A normal semi-automatic or single operation is as follows:

With the control on-off switch 182 closed and the cycle on-off switch 286 (see Figure 14) engaging the terminal 287, pushing the cycle start button will energize the scale tripping solenoid 257 permitting salt to flow into the mold 29 (Figure 16), provided that limit switches 263, 262, 261 and 260 are all closed indicating that the ram is up, the mold 29 and lower die 44 are in Figure 16 position and that the scale 275 is full.

When the scale has emptied the limit switch 256 operated by the weight 278, connected to the scale, will close and through the switch blade 215, pertaining to the then energized solenoid 208, deenergize the scale tripping solenoid 257 and through relay 211, also pertaining to the solenoid 208, energize the timing relay 213.

At the end of the setting of this timing relay the solenoid 192 and, thereby, the ram or pump solenoid 191 will be energized starting the ram on its forward stroke.

Pressure is built up by the ram at the end of the forward stroke to the setting of the tonnage control switch 188 reversing the ram and resetting the timing relay 213.

During the downward stroke of the ram, pressure is applied to the mold 29 through the mechanical linkage 36, 39, preloading the mold so that when the ram reverses the mold will follow. Also as the result of another mechanical linkage 95, 84, 87 on the reverse stroke of the ram, the latter will make only a partial stroke. After the mold has been raised through a hydromechanical linkage 41, 42, 107, 109, the die 44 is withdrawn from under the mold.

When the die 44 is completely withdrawn, the limit switch 197 will be operated, which will again energize the solenoid 192 and, thereby, the ram solenoid 191 in the forward direction, starting it again on a downward stroke.

On this downward stroke the salt block 293 will be ejected and the ram will travel until the limit switch 250 is operated, which reverses the ram.

At the time the ram reverses, the solenoid 240 is deenergized, thereby preventing repeating of the cycle, so that the machine will stop when it reaches its starting position.

Through a hydromechanical linkage 51, 108, 127, operatively connected with the ram, the die 44 will return to its normal position during this second reverse stroke of the ram, and through the mechanical linkage 36, 39, when the die is again in its normal position, then mold 29 will return to its normal position. On this reverse stroke, the ram makes a complete stroke and returns to the starting point.

During this second reverse stroke, the limit switch 220 (Figure 15) is operated for a short period of time energizing the solenoid valve 221 for blowing loose salt from the face of the die 44. No other interlocking between the control for this solenoid valve and the balance of the control is provided.

With the selector switch 241 set for repeat cycle or full automatic operation, the first cycle is started by the operation of the cycle start push button 237, as outlined above. However, in this case the control circuit will be set when the four limit switches 263, 262, 261 and 260, indicating that the ram is up, the scale is full and the mold 29 and die 44 are in normal position, are all closed, since in this instance the solenoid 240 stays energized throughout the complete retraction stroke of the ram; the scale will then immediately trip, thereby starting another cycle.

It will be understood that I desire to comprehend within my invention such modifications as come within the scope of the claims and the invention.

Having thus fully described my invention, what I claim as new and desire to secure by Letters Patent, is:

1. In a molding press, a press plunger, fluid operable means for reciprocating said plunger, a reversible variable delivery pump for supplying pressure fluid to said fluid operable means to actuate the same, a reciprocable control rod operable to shift said pump to neutral or no delivery position and mechanical control means including a pivoted member adapted to engage said rod during a portion of its movement in one direction movable concomitantly with said plunger independently of the angular position of said rod with respect to its longitudinal axis for mechanically shifting said pump to neutral or no delivery position at two different points of travel of said mechanical control means during two succeeding strokes thereof in one and the same direction.

2. In combination, a reciprocable member, fluid operable advancing and retracting means for reciprocating said member, a fluid source of variable pressure for supplying pressure fluid selectively to said advancing or retracting means, a push rod operatively connected with said fluid source for varying the delivery thereof, said push rod having connected thereto abutment means, lever means slidable on said push rod and operable selectively to engage or by-pass said abutment means, yielding means continuously urging said lever means toward the longitudinal axis of said rod, and means associated with said platen for moving said lever means concomitantly with said platen.

3. In a molding press, a press platen, a first die supported by said platen, means for reciprocating said platen, a second die, a die carrier operable to move said second die selectively into or out of alignment with said first die, a mold open at its top and bottom for receiving said dies, fluid operable means for selectively moving said mold relative to said dies, hydraulic motor means for actuating said die carrier, valve means for controlling the supply of fluid to said hydraulic motor means, a lever system for actuating said valve means, and cam means associated with said platen for actuating said lever system, said lever system including a plurality of pivoted levers and means for urging the ends of said levers toward each other.

4. In a molding press, a reciprocable mold open at its top and bottom, a pressing plunger for compressing material in said mold, means for actuating said plunger, a die movable selectively into or out of the bottom portion of said mold, a die carrier for receiving said die and selectively moving the same into or out of alignment with said plunger, hydraulic motor means for actuating said die carrier, fluid operable means for moving said mold relative to said die, and cam operated valve means responsive to the movement of said plunger for controlling said hydraulic motor means, said cam operated valve means comprising a valve member having pivotally connected thereto two independently movable lever arms cooperating with different cam surfaces and a spring continuously urging said valve member into a predetermined position.

5. In a control system, cam means comprising two different cam surfaces, means for reciprocating said cam means, a pivoted control member, yielding means continuously urging said member into one position, a first lever pivotally connected to said member and operable by one of said cam surfaces in response to a predetermined travel of said cam means in a first direction to shift said member into a second position, and a second lever pivotally connected with said first mentioned lever and operable by the other of said cam surfaces in response to a predetermined travel of said cam means in a second direction for locking said control member in said second position.

6. In a control system, cam means comprising two different cam surfaces, means for reciprocating said cam means, a pivoted control member, yielding means continuously urging said member into one position, a main lever pivotally connected with said control member and operable to move said control member into a second position, and a pair of auxiliary levers pivotally connected with said main lever and respectively cooperating with one of said cam surfaces, one of said auxiliary levers being adapted in cooperation with one of said cam surfaces and in response to a predetermined travel of said cam means in a first direction, to shift said main lever for effecting movement of said control member into said second position, and the other of said auxiliary levers being adapted in cooperation with the second cam surface of said cam means in response to a predetermined travel thereof in a second direction to lock said control member in said second position.

7. In a control system, a reciprocable member having two spaced abutment means mounted thereon, control means on said reciprocable member and movable relative thereto, said control means having pivotally connected thereto one end of two levers, means for reciprocating said control means, yielding means connecting the free ends of said levers and continuously urging the same toward each other, said free ends being adapted when moved toward each other and in response to a predetermined travel of said control means in a first direction to abut one of said abutment means for actuating said reciprocable member, and actuating means movable on said reciprocable member and operable to engage said second abutment means, said actuating means acting, in response to its engagement with said second abutment means, while said control means is being moved in a second direction, to spread said levers apart and to hold the same spread apart when subsequently the movement of said control means is reversed, thereby preventing said levers from abutting said first abutment means.

8. In a molding press, a press head, a press bed, a press plunger reciprocable in said press head, a horizontally reciprocable die carrier guided on said bed and having detachably connected therewith an extension member with a fork shaped portion, said die carrier being movable selectively into or out of alignment with said press plunger, and a reciprocable control plunger having a shouldered portion straddled by said fork shaped portion for conveying movement of said control plunger to said die carrier.

9. In a molding press, a press head, a press bed, a press plunger reciprocably mounted in said press head, a horizontally reciprocable die carrier guided on said press bed and movable selectively into or out of alignment with said press plunger, an extension member detachably connected to said die carrier and having a fork shaped portion, a hydraulically reciprocable control plunger comprising shoulders to receive said fork shaped portion for conveying movement of said control plunger to said die carrier, valve means for controlling the supply of pressure fluid to said control plunger for actuating the same, and cam means movable by said press plunger for controlling operation of said valve means.

10. In a molding press, a press head, a hollow press bed, a press plunger reciprocably mounted in said press head, a die carrier movable in a direction transverse to the direction of movement of said press plunger selectively into or out of alignment with said press plunger, a cylinder detachably mounted in said hollow bed, a fluid operable control plunger operatively connected with said die carrier and reciprocably mounted in said cylinder, sealing means surrounding said control plunger and adjustable from the outside of said press bed, adjusting means in said cylinder and operable from the outside of said press head for varying the stroke of said control plunger, and means likewise operable from the outside of said press bed for allowing removal of said cylinder, control plunger, sealing means and adjusting means as a unit from said bed.

11. In a molding press, a mold for receiving molding material, a reciprocable molding plunger for molding said molding material, electric means operable to initiate a working cycle of said plunger, filling means for dispensing a predetermined charge into said mold, means responsive to the actuation of said electric means for actuating said filling means to dispense said predetermined charge, electric switch means responsive to the completion of the dispensing of said charge for recharging said filling means and preventing said filling means from dispensing another charge prior to a reciprocation of said plunger, and manually operable means for making said switch means ineffective to allow dispensing of another predetermined charge into said mold prior to a reciprocation of said plunger.

12. In a molding press, a mold for receiving molding material, a molding plunger for molding the molding material in said mold, dispensing means for dispensing a predetermined load of molding material into said mold, electric means operable in response to the completion of the discharge of said predetermined load into said mold for actuating said molding plunger to effect a molding operation, and manually operable means for selectively making said electric means ineffective to allow said dispensing means to discharge a plurality of predetermined loads into said mold prior to actuation of said molding plunger.

13. In combination, a reciprocable member, fluid operable advancing and retracting means for reciprocating said member, a fluid source adapted to supply pressure fluid selectively to said advancing or retracting means, a reciprocable control rod having an abutment thereon and being operable to reduce the delivery of fluid from said fluid source to said retracting means, supporting means reciprocable concomitantly with said reciprocable member and having pivotally connected thereto an arm continuously urged against said rod and adapted in response to a predetermined travel of said reciprocable member to engage said abutment for actuating said rod, and a reciprocable element slidable on said supporting means and operable selectively to space said arm from said rod to allow engagement of said abutment with said element to bring about actuation of said rod by said element.

PAUL E. FLOWERS.